"OR"

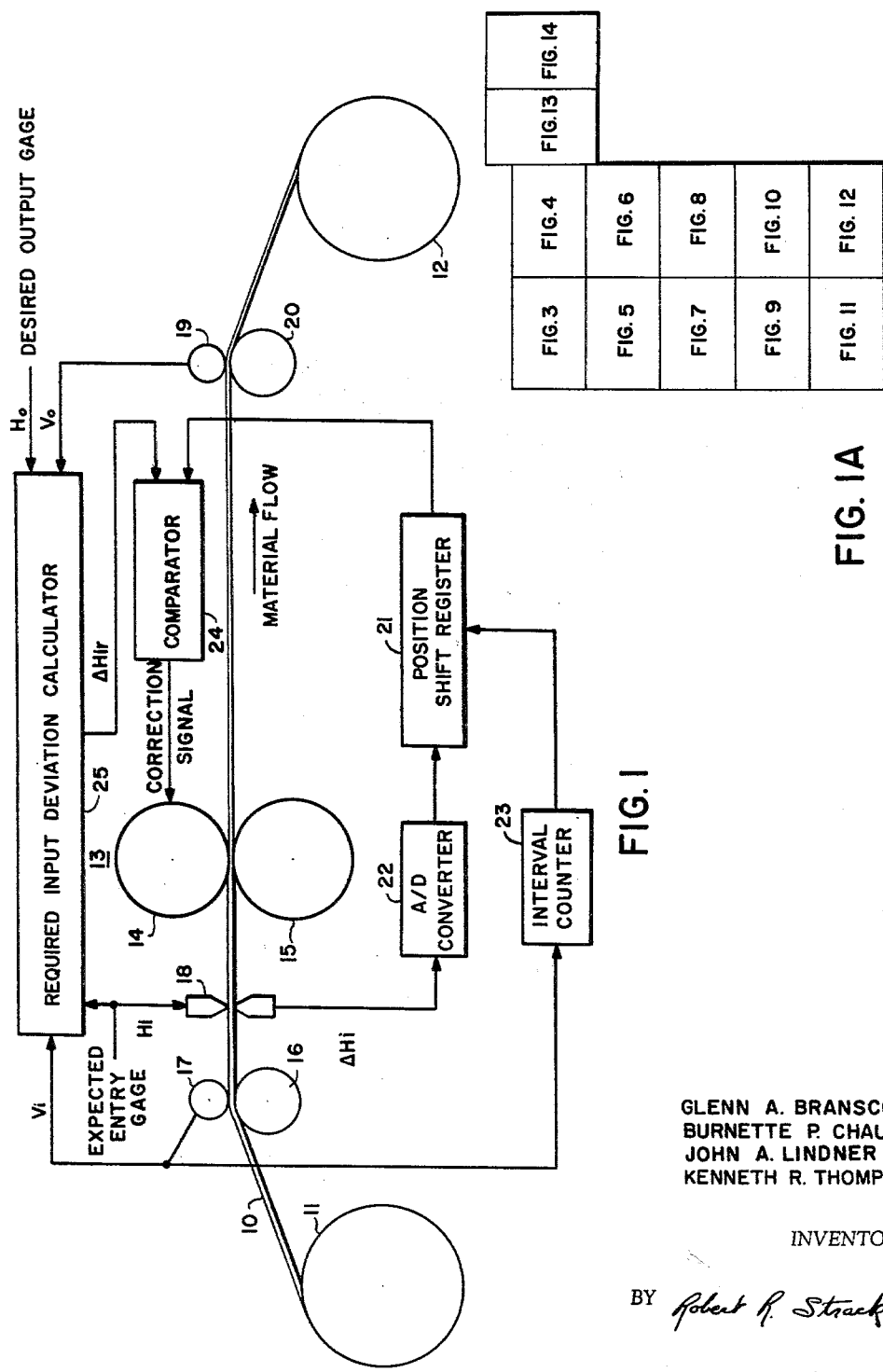
Feb. 16, 1965 G. A. BRANSCOM ETAL 3,169,424
AUTOMATIC CONTROL SYSTEM FOR ROLLING
MILLS AND ADJUSTABLE DIES
Filed Jan. 30, 1962 15 Sheets-Sheet 1
GLENN A. BRANSCOM
BURNETTE P. CHAUSSE
JOHN A. LINDNER
KENNETH R. THOMPSON
INVENTORS.
BY Robert R. Strack
ATTORNEY

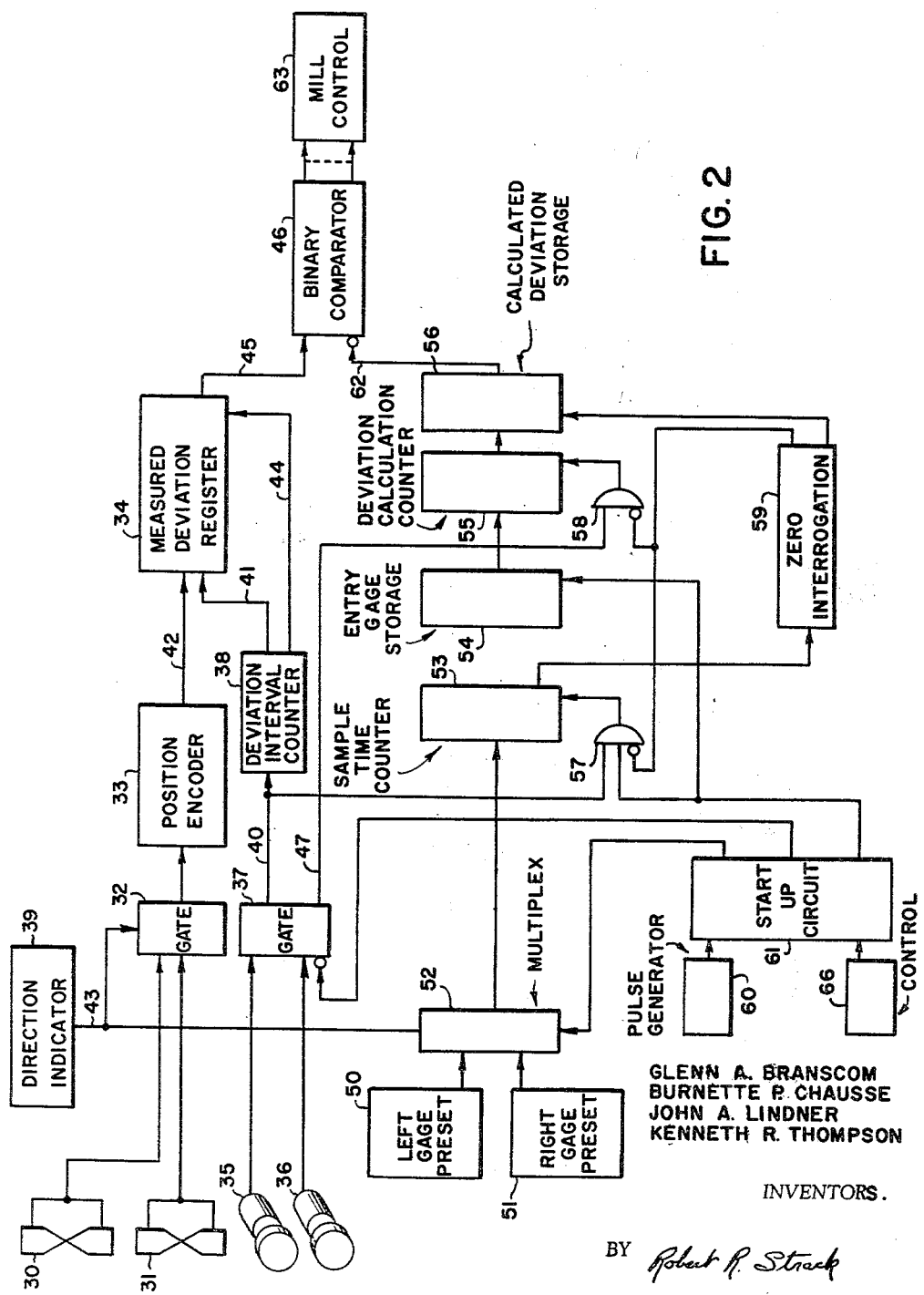

INVERTED "OR"

"AND"

INVERTED "AND"

AMPLIFIER

FLIP-FLOP

SHIFT REGISTER STAGE

COUNTER STAGE

"ONE SHOT" MULTIVIBRATOR

"TRIGGER"

FULL ADDER

GLENN A. BRANSCOM
BURNETTE P. CHAUSSE
JOHN A. LINDNER
KENNETH R. THOMPSON

INVENTORS

BY *Robert of Strack*

ATTORNEY

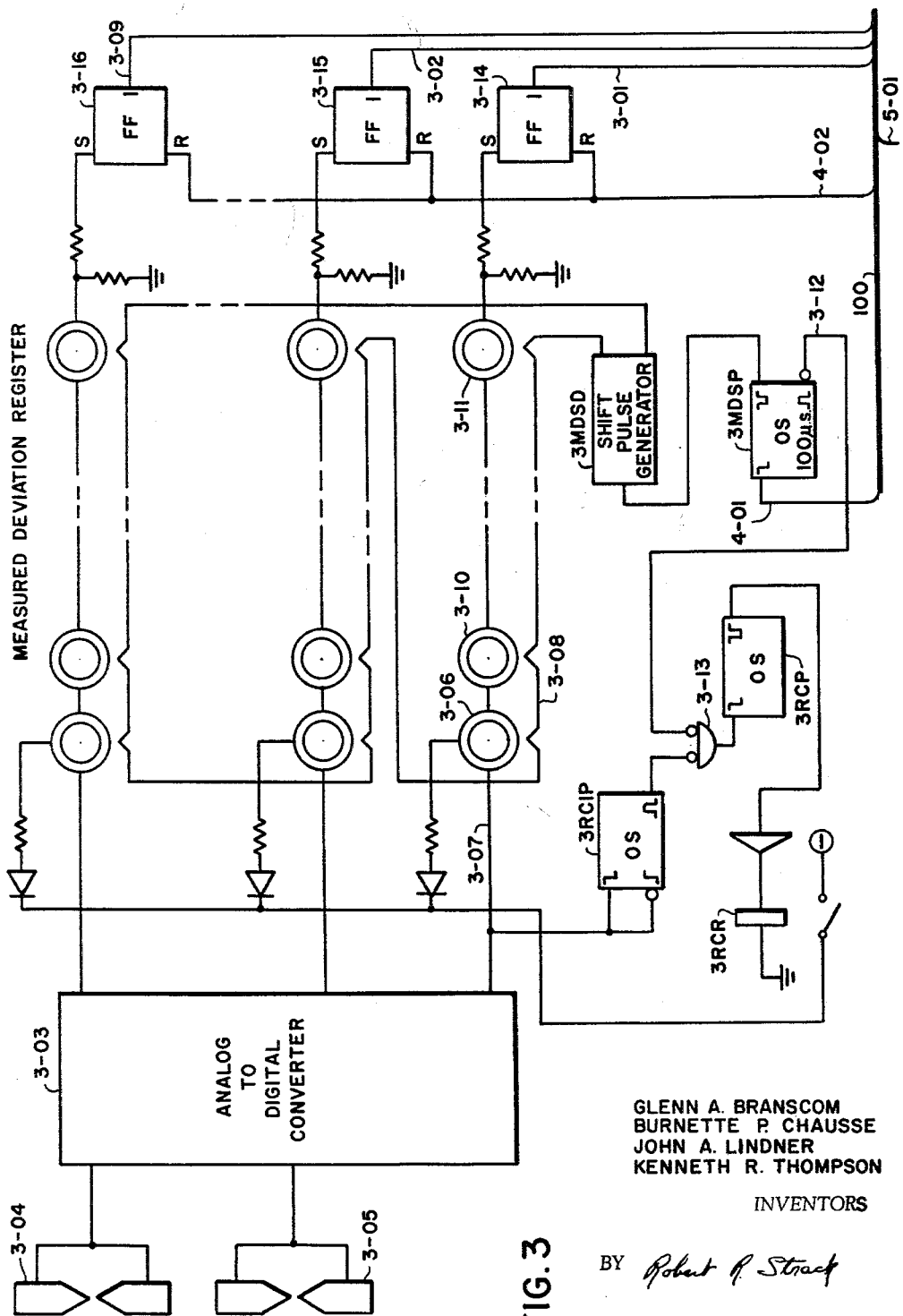

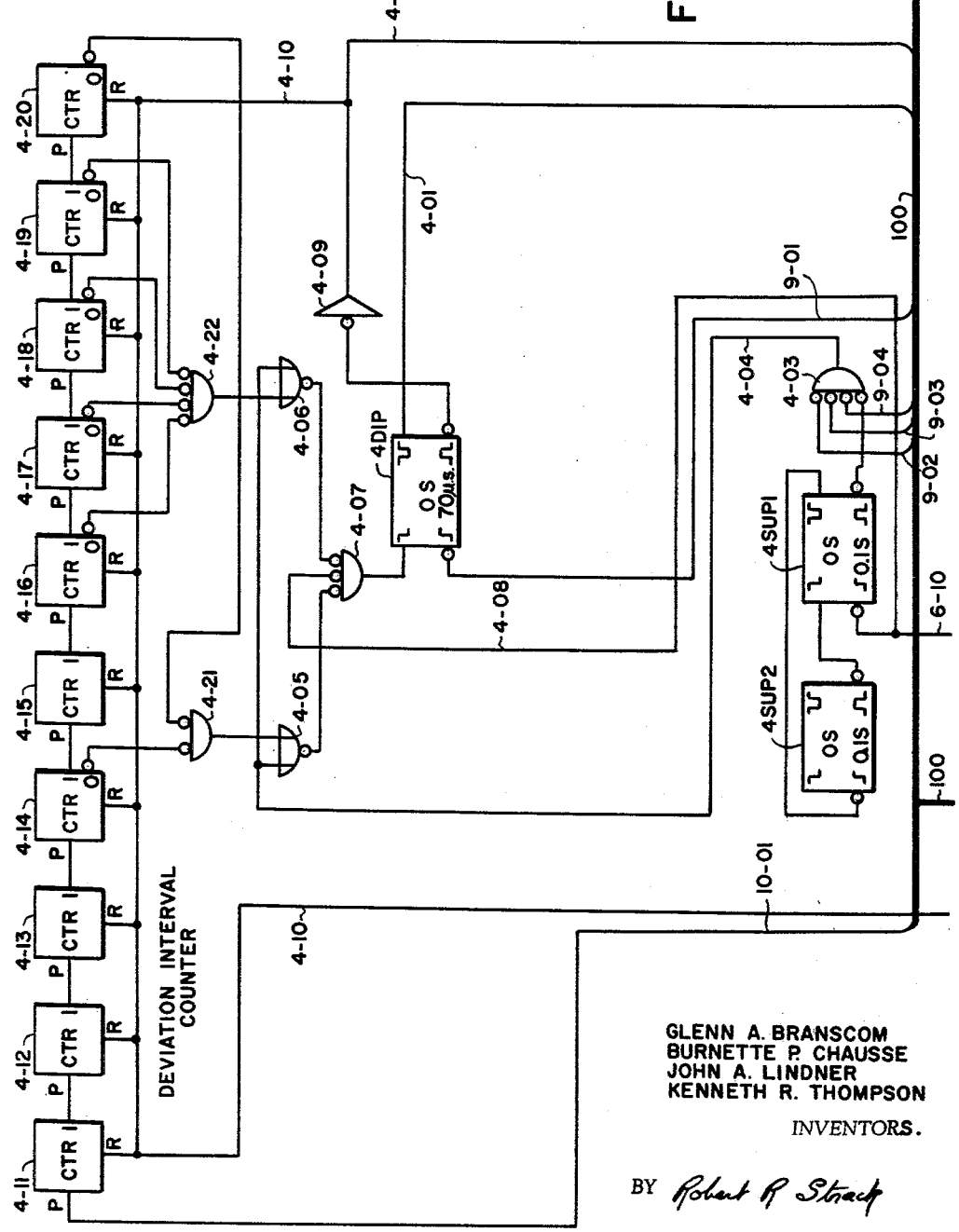

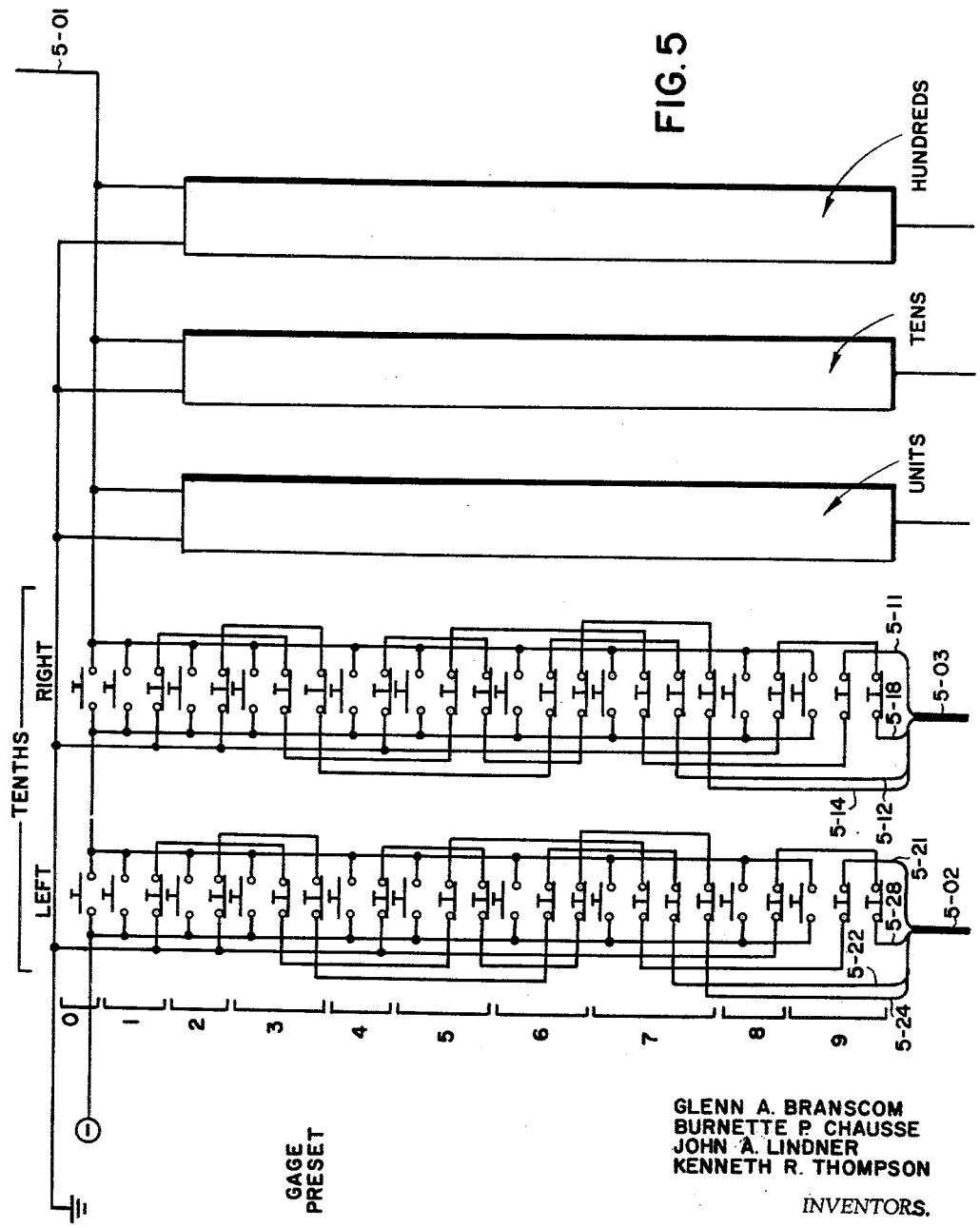

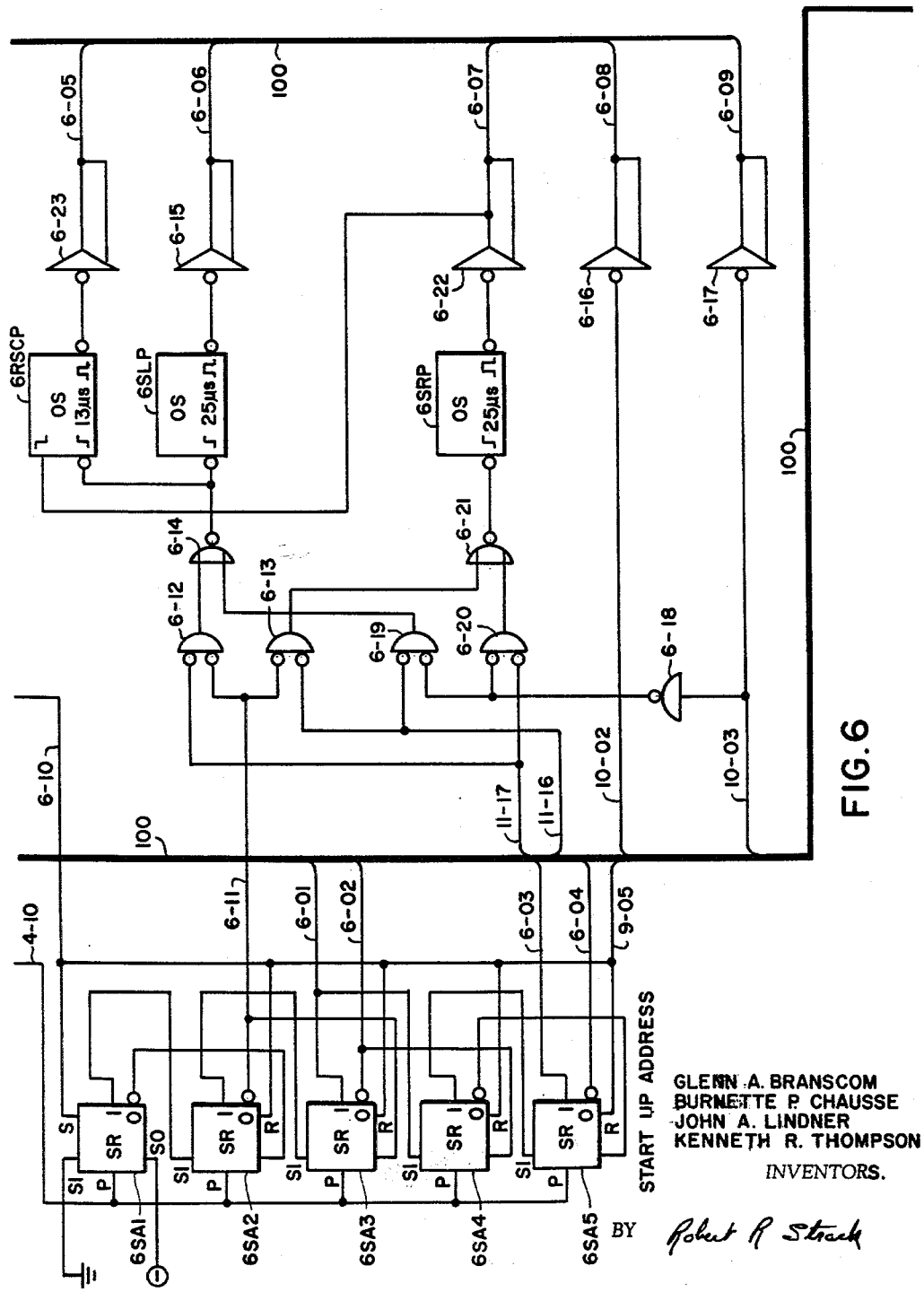

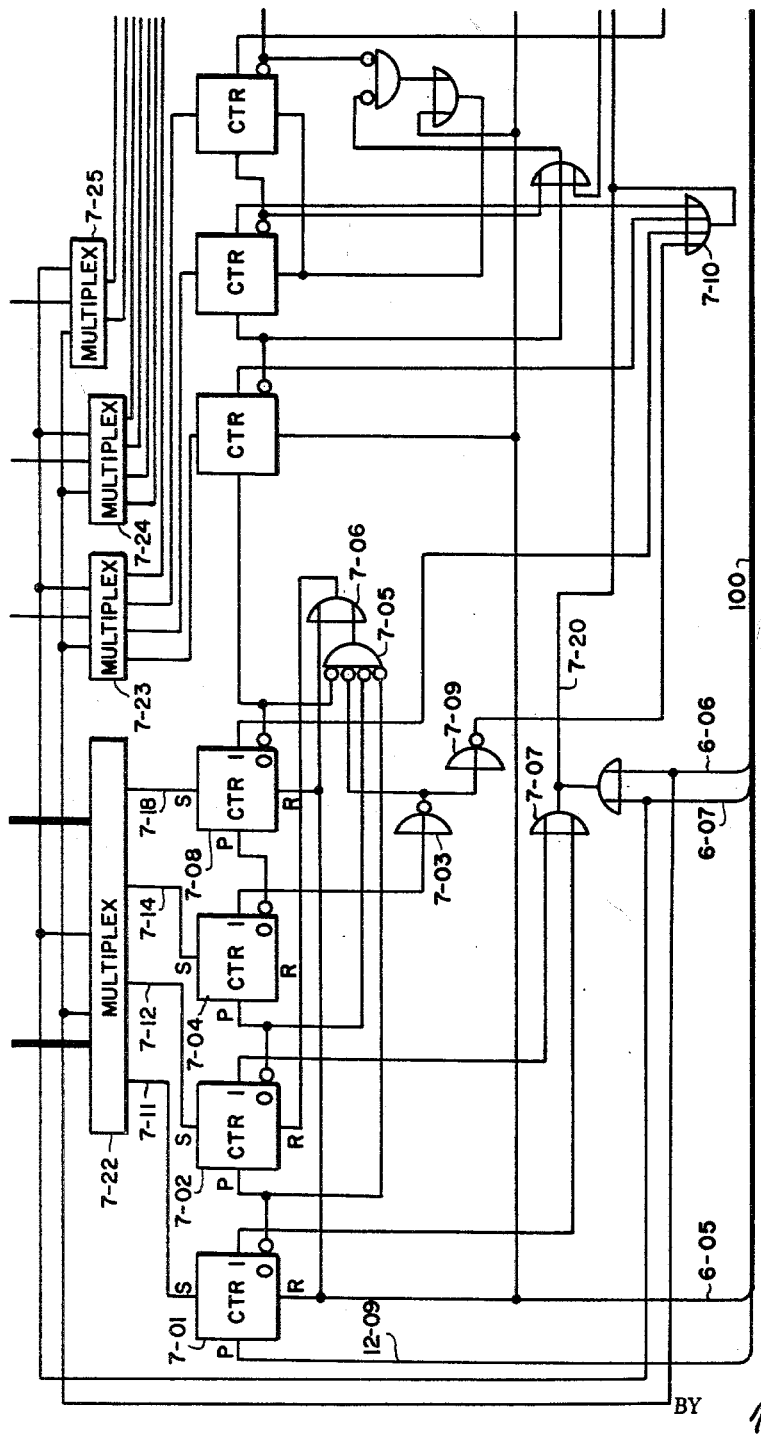

GLENN A. BRANSCOM
BURNETTE P. CHAUSSE
JOHN A. LINDNER
KENNETH R. THOMPSON
INVENTORS.

BY Robert A. Strack

ATTORNEY 3,169,424
AUTOMATIC CONTROL SYSTEM FOR ROLLING
MILLS AND ADJUSTABLE DIES
Glenn A. Branscom, Burnette P. Chausse, John A. Lindner, and Kenneth R. Thompson, Roanoke, Va., assignors to General Electric Company, a corporation of New York
Filed Jan. 30, 1962, Ser. No. 169,888
9 Claims. (Cl. 80—56)

This invention relates to the production of material by rolling or drawing through rolling mills or dies having adjustable separation between opposing surfaces. More particularly, the invention relates to measuring and control systems for association with such equipment for adapting it to produce material having a highly uniform gage thickness.

Generally, the invention is directed to the automatic production of material by rolling through a single or multiple stand rolling mill or by drawing through single or multiple dies of the kind having opposing die surfaces. The control of such operations requires continuous monitoring of the output dimensions, generation of correction signals, and feedback of the correction signals to the separation control means. The efficiency and reliability of control is determined by the accuracy, speed of operation, and simplicity of the control system. Presently, there are three techniques which are employed jointly or separately in the majority of systems. These techniques include: making gage measurements beyond the exit of a rolling mill or die, comparing them with the desired gage, and generating correction signals; making elongation measurements beyond the exit of the mill or die, comparing them with a calculated elongation value based upon knowledge of the original length and dimensions of the material, and generating correction signals; and making roll pressure measurements, comparing them with a calculated roll pressure based upon knowledge of the material's properties, and generating correction signals to compensate for discrepancies.

In systems controlling moving material where there is a physical displacement between the place where measurements are made and the place where actions are taken in response to these measurements, the location of the measuring means and the speed with which the measurements are made is important. Furthermore, the "transport time," i.e., the time required for an increment of material to traverse the distance between the measuring means and the point of action, or vice versa, is important. The effect of these factors is clearly illustrated by the problems encountered in use of the aforementioned control systems.

When using gage measurements at the exit of a rolling mill in order to adjust the mill to obtain the desired output dimensions, the distance between the bite of the rolls and the measuring gage, commonly referred to as "transport distance," makes it impossible to modify an existing mill condition until at least a length of material equivalent to the transport distance has been processed. In addition to this, if the correction is insufficient, it will not be realized until an additional strip of material equivalent to the transport distance has again been processed. Where the input gage is subject to variation, the material wastage and undesirable results of systems controlled by gage measurements at the exit side of the mill become even more pronounced.

Control systems employing elongation measurements eliminate the problems created by transport distance. These systems operate on the principle that for a particular increment of length passing into the mill, there will be an equal or greater increment of length emitted. If the width of material is constant, the length upon exit is proportional to the amount of reduction. In an elongation measuring system, the transport time is essentially zero and the "sensing time," i.e., the time required to sense the degree of elongation, can be reduced to a minimum. These systems have shortcomings, however, which are extremely serious. Such systems are operative to reduce material by a given percentage and not by a given dimension; consequently, unless the entry gage is constant, the gage of the processed material will vary in proportion to the entry gage variations.

Mill control systems based upon measurements of roll pressure also eliminate transport time and transport distance as material wastage factors but serious disadvantages are substituted. One of the most pronounced shortcomings is the effect of variations in material hardness. Because hard materials will not be reduced in dimension as much as soft materials under a given roll pressure, where the strip hardness varies, the gage of the material after processing varies.

The present invention is based upon the fact that the volume of material exiting from a mill or die must be equal to the volume of material entering the mill or die. As described hereinafter, the control system measures the deviation of the entry gage from an expected value and compares this actual deviation with a value computed on the basis of the equal volume property of the process. The difference between the actual deviation and the calculated deviation is then used as an error signal to correct the mill or die setting to yield the desired output. This control system relies upon measurement of the entry gage before entry into the mill or die and adjusts the setting thereof when the material is in proximity thereto. Use of such "before the fact" measuring, permits control over the mill in accordance with the dimension of the material instantaneously under its bite. Ideally, therefore, material wastage is minimized.

An object of the invention is to provide an improved automatic control system for rolling mills or drawing mills wherein the mill or die separation is corrected to process an increment of material in accordance with signals developed in response to actual measurements of that particular increment of material. Thus, there is no material wastage due to physical separation between the measuring means and the bite of the mill or die.

Another object of the invention is to provide an improved automatic control system for rolling mills or drawing mills wherein the entry and exit volumes of the material in relation to the mill are monitored to produce an error signal calculated to adjust for desired output specifications.

A system employing the equal volume property used in the present invention has been disclosed in Patent No. 3,015,974, issued to Orville E. Orbom, James B. Murkland, Jr., and Fred J. Schultz, on January 9, 1962, and assigned to the General Electric Company. In the cited patent, the entry gage required to yield a desired output gage is calculated using the entering and exit strip length and the desired output gage as variables. The required entry gage is then compared with the measured value of the entry gage. Assuming that the entry and exit widths are identical, the difference between the calculated input gage and the actual input gage is used to control the mill setting.

In general, deviations in entry gage are small in magnitude in comparison with the total entry page. When calculations are performed using large rather than small numbers, more stages of equipment are needed to obtain the same degree of accuracy. Also, where counting operations are involved, the time required to complete a cycle of operation wherein large numbers are involved is greater than that required for smaller numbers. Accordingly, the present invention is directed toward developing control signals from the deviation of the entry gage from an expected value rather than from the actual entry gage value as in the cited patent. As a result of the invention, the control equipment is greatly simplified and the accuracy of the exit gage is controlled to a considerably smaller increment of error.

Another object of the invention is to provide an improved automatic gage control system wherein the mills or dies are controlled in response to measurements of deviation of the entry gage from an expected value; these deviations being compared with a calculated deviation from measured entry and exit velocities of the material and the known desired output gage.

In accordance with an illustrative embodiment of the invention, a mill stand is adjusted to provide a particular separation under control of signals derived from measurements of the increment of material at the bite of the mill. Digital tachometers at entry and exit points of the mill develop pulse trains having a repetition rate commensurate with the entry and exit velocity of the material being processed. These pulse trains are used as counting impulses to operate upon binary countdown registers which initially store numbers representing the desired exit gage and the expected entry gage respectively. When the register initially containing the desired exit gage has been counted down to zero, the number still remaining in the register initially containing the expected entry gate represents the entry gage deviation required to produce the desired output gage. A Binary Comparator is used to compare this calculated required entry gage deviation with a binary representation of the actual entry gage deviation in order to develop control signals for appropriate mill adjustment. Because gage measurements cannot be made directly at the bite of the mill, the entry gage deviation is measured a known distance before the bite and stored in a shift register. Shifting pulses derived from the entry tachometer step the stored measurements in synchronism with the material movement and facilitate comparison with the calculated value when the measured increment of material is in proximity with the mill bite.

The novel features of the invention are set forth with particularity in the appended claims. The invention itself, however, both as to its organization and method of operation, together with further objects and features thereof, may best be understood by reference to the following description taken in conjunction with the drawings wherein:

FIG. 1 is a simplified block schematic illustrating the principles of the present invention;

FIG. 1A is a sheet layout showing the placement of FIGS. 3-14 in order to yield a circuit schematic of an illustrative embodiment of the invention;

FIG. 2 is a more detailed block schematic illustrating the various functioning circuits employed in carrying out an illustrative embodiment of the invention;

FIGS. 2A-2K are illustrations of the symbols used to represent the circuit elements employed in the illustrated embodiment; and FIG. 3 through FIG. 14, when taken together in accordance with the layout of FIG. 1A, is a circuit schematic of an illustrative embodiment of the invention showing the various subcircuits employed to control a single stand of a mill.

GENERAL DESCRIPTION

Figure 2A:
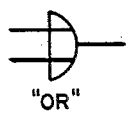
Figure 2B:
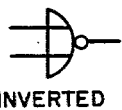

The following equations illustrate mathematically the operations which are performed in order to generate control signals having an amplitude commensurate with the amount of mill correction required:

$$(H_i + \Delta H_i)v_i = (H_o + \Delta H_o)v_o \quad (1)$$

$$\Delta H_i = H_o \frac{v_o}{v_i} - H_i + \Delta H_o \frac{v_o}{v_i} \quad (2)$$

$$\Delta H_{ir} = H_o \frac{v_o}{v_i} - H_i \quad (3)$$

$$t = \frac{H_o}{nv_i} \quad (4)$$

$$s = H_i - tnv_o = -\Delta H_{ir} \quad (5)$$

$$\Delta H_i - \Delta H_{ir} = -\Delta H_o \frac{v_o}{v_i} \quad (6)$$

In the equations, "H" represents gage, and "v" represents velocity of material movement. The subscripts "i" and "o" denote input and output quantities respectively. It is assumed that the width of the material does not change appreciably and consequently, may be disregarded.

Equation 1 expresses the constant volume property of the process. The total entry gage is shown as the expected entry gage $H_i$ plus the deviation from this value $\Delta H_i$ and the total exit gage is shown as the desired output gage $H_o$ plus the deviation from this value $\Delta H_o$. The equal volume aspect of the process is included by multiplying the entry gage by the entry velocity $v_i$ and the exit gage by the exit velocity $v_o$.

Equation 2 is obtained by extracting the input deviation $\Delta H_i$ in Equation 1 and setting it up as a function of the other variables therein. Equation 3 sets forth the input gage deviation $\Delta H_{ir}$ when the output gage deviation $\Delta H_o$ is zero. In other words, Equation 3 indicates the input deviation required to develop the desired output gage $H_o$.

Equations 4 and 5 illustrate the technique used in the system described herein to obtain the required entry deviation $\Delta H_{ir}$. Equation 4 indictaes that division of the desired exit gage $H_o$ by a multiple of the entry velocity $nv_i$, yields a time $t$. As shown by equation 5, if a quantity equal to the time $t$, thus established, is multiplied by the exit velocity $nv_o$, and the product is subtracted from the expected entry gage $H_i$, a value $s$ is obtained that is equal to the negative of the required entry gage deviation $\Delta H_{ir}$.

Subtraction of the required entry deviation $\Delta H_{ir}$ from the actual entry deviation $\Delta H_i$ yields a value directly proportional to the output gage deviation $\Delta H_o$ which may consequently be used to cause corrective adjustment of the mill.

In the embodiment hereinafter described, a countdown register is preset with a binary number which represents the desired output gage and is counted down to zero by the output of the entry tachometer in the time indicated in Equation 4. A second countdown register is preset with a binary number which represents the expected entry gage and is counted down by the output of the exit tachometer during the interval when the first register is going to zero. As Equation 5 illustrates, the number remaining in the second register after the first has reached zero represents the negative of the required entry deviation for correct output gage. A digital comparator performs the subtraction of Equation 6 to yield the desired control signal.

A general understanding of the control equipment used to implement the mathematical operations indicated by the foregoing equations is available from an examination of FIG. 1. As illustrated, a material 10 is transported from a reel 11 to a reel 1 in response to rotation of the reels by a prime mover which is not shown. In the course of transportation, material 10 is acted upon by mill 13 which comprises an upper roll 14 and a lower roll 15. An entry digital tachometer 17 mounted in conjunction with an idler 16 measures the entry velocity. An entry gage 18 produces signals representative of gage deviations from a preset value. At the exit of the mill, on the right of FIG. 1, an exit digital tachometer 19 operating in conjunction with an idler 20 measures the exit velocity of the material.

The electrical equipment involved is functionally illustrated by a plurality of blocks. In order to insure that the measurements control the mill at the instant the increment of material measured enters the bite of the mill, the measured entry gage deviation is stored for a time equivalent to the time required for the material to move from the entry gage 18 to the bite of the mill. This storage is accomplished by means of a position shift register 21. The input to the shift register is a binary coded representation of the entry gage deviation $\Delta H_i$, detected by entry gage 18. In the embodiment shown hereinafter, the gage 18 is assumed to be of an analog type and consequently an analog-to-digital converter 22 is inserted in order to provide appropriate input information for shift register 21. The deviation gage information is shifted through shift register 21 in synchronism with the movement of the material from entry gage 18 to the bite of the mill by the application of shift pulses from a counter 23 driven by entry digital tachometer 17. Counter 23 supplies shift pulses at some fixed interval, related to the transport time of material 10. For example, for every six inches of travel of material 10, entry gage deviation values may be read into shift register 21 and shifted along in synchronism with the material flow. Just before the measured increment of material enters the bite of the mill, position shift register 21 supplies the actual entry gage deviation to a comparator 24 wherein it is compared with the required entry gage deviation to develop a correction signal to adjust the mill and insure the desired output gage $H_o$.

Obviously, it is necessary to calculate the required input deviation in order to develop the corrective control signal set forth in Equation 6. This calculation is performed in the required input deviation calculator 25 shown at the top of FIG. 1. The inputs to this calculator include: the entry velocity $v_i$, obtained from entry digital tachometer 17; a preset expected entry gage figure $H_i$; the exit velocity $v_o$, obtained from exit digital tachometer 19; and the desired output gage $H_o$. The input deviation calculator 25 operates in response to this input data to provide the required input deviation $\Delta H_{ir}$. The specific circuitry employed in required input deviation calculator 25 is shown in further detail hereinafter.

Comparator 24 functions in well known fashion to develop a signal uniquely representative of the difference between its two inputs which, as shown by Equation 6 in column 4, is proportional to the correction required in the mill setting. In response to this signal, the mill is adjusted to provide the necessary separation at the bite to yield the desired exit gage.

FIG. 2 is a somewhat more detailed block diagram schematic showing the electronic subcircuits employed to perform the calculating functions required. In FIG. 2, provision is made for mill operation with material flow in either direction. In order to make this possible, symmetrical equipment is positioned on both sides of the mill stand and the data obtained therefrom is gated into the appropriate circuitry for calculating the desired values. Accordingly, whereas FIG. 1 illustrates only a single gage 18, FIG. 2 contains both a right gage 30 and left gage 31.

The circuitry required for developing binary data indicative of the measured deviation $\Delta H_i$ at the entry to the mill and storing that measured deviation until shortly before the measured increment of material is in the bite of the mill, is disposed generally across the upper portion of FIG. 2. Right gage 30 and left gage 31 are physically positioned to right and left of the mill stand respectively. The gage measurement that is used as expressing the deviation from the expected entry gage is determined by the rolling direction and this is interpreted by a device 39 which may take any form, including a manual switch. In accordance with the particular rolling direction involved, a signal is provided over lead 43 to a gate 32 which passes the gage information from either right gage 30 or left gage 31 to a position encoder 33. The function of the encoder is to convert the gage information into a binary form for insertion in a measured deviation register 34. Where the gages provide an analog output, as assumed herein, position encoder 33 functions to convert the analog signals to a binary form.

Pulse tachometers 35 and 36 are located on the left and right of the mill stand respectively and provide a plurality of pulses having a repetition rate commensurate with the speed of material flow. These pulses are selectively gated to count down either Deviation Interval Counter 38 and Sample Time Counter 53 or Deviation Calculation Counter 55 in accordance with the particular direction of material flow. This gating is under the control of the rolling direction indicator 39 and is controlled by a signal on lead 43. If it is assumed forward operation is in progress, pulse tachometer 35 is on the entry side of the mill and the pulses therefrom will be applied via lead 40 to Deviation Interval Counter 38 and after suitable delay therein will be applied via lead 41 to the Measured Deviation Register 34. The function of Deviation Interval Counter 38 is to permit a predetermined length of material to pass between each registration of entry gage data into the Measured Deviation Register 34. This predetermined length will vary in accordance with the accuracy of control desired but, for example, may be arranged to provide a shift pulse on lead 41 for every six inches of material operated upon.

The joint application of shift pulses on lead 41 and gage data on lead 42 causes Measured Deviation Register 34 to shift the data therethrough and present it on lead 45 at the time the increment of material measured is almost at the bite of the mill. Lead 45 applies the gage data, representing the actual deviation of the entry gage $\Delta H_i$, to Binary Comparator 46 wherein it is compared with the calculated deviation $\Delta H_{ir}$. After comparison, the output stages supplying signals to lead 45 are reset by a control pulse on lead 44 from Deviation Interval Counter 38.

The calculated deviation $\Delta H_{ir}$, for comparison with the measured deviation $\Delta H_i$, is developed by the circuitry appearing in the lower portion of FIG. 2. The expected entry gage $H_i$ and the desired output gage $H_o$ are introduced into the control system by means of push-button panels 50 and 51; the particular panel in which the data is stored being determined by the rolling direction anticipated. When the control system is energized, pulsing from pulse generator 60 via Start-up circuit 61 is effective to preset the Entry Gage Storage Counter 54 with the expected entry gage information contained in the appropriate push-button panel 50 or 51. After setting the Entry Gage Storage Counter 54, the Start-up circuit 61 gates the desired output gage from the appropriate push-button panel 51 or 50 into Sample Time Counter 53, and simultaneously initiates transfer of the entry gage data from Entry Gage Storage 54 to the Deviation Calculation Counter 55.

When the material begins moving through the mill, control calculations are made by pulsing down the number representing the desired output gage $H_o$ in Sample Time Counter 53 with the velocity $v_i$ provided by entry tachometer 35 over lead 40. This establishes a period "$t$" in accordance with Equation 4 in column 4. During this countdown operation, the expected entry gage $H_i$ in the Deviation Calculation Counter 55 is pulsed down by the velocity $v_o$ provided by exit tachometer 36 over lead 47. Gates 57 and 58 are simple logic gates employed to limit the period of countdown and are controlled by a Zero Interrogation circuit 59 which stops the countdown process in Sample Time Counter 53 and Deviation Calculation Counter 55 whenever Sample Time Counter 53 registers zero. The number existing in the Deviation Calculation Counter 55 when the Sample Time Counter 53 has been pulsed to zero is transferred into the Calculated Deviation Storage 56. This number is equal to the required input gage deviation $\Delta H_{ir}$ to obtain the desired output gage, so illustrated by Equation 5 in column 4. It is applied over lead 62 to the input of Binary Comparator 46 for comparison with the measured deviation $\Delta H_i$.

Binary Comparator 46 may be fabricated in any well known fashion. It functions to provide an output which is equivalent to the difference between the input deviation $\Delta H_i$ and the required input deviation $\Delta H_{ir}$. One binary comparator suitable for use in the instant embodiment is fully described in the co-pending patent application of K. R. Thompson, Serial No. 159,264, filed December 14, 1961, and assigned to the General Electric Company. The output of the Binary Comparator is in digital form and may be directly applied to control the mill adjusting screws. The mill control equipment is designated 63. It is converted in a conventional digital-to-analog converter 63 in order to develop an error sense indication.

With the general functioning of this invention in mind, a still more complete understanding will be available from a consideration of a specific circuit designed to perform the described functions. It should be understood, of course, that the various blocks shown in FIG. 2 and the functions performed thereby may be developed in a number of ways by persons skilled in the art and that the specific circuitry illustrated in FIGS. 3 through 14 and described hereinafter, is merely by way of example.

DETAILED DESCRIPTION

Circuit symbology

In order to more succinctly set forth the circuit schematic in FIGS. 3 through 14, conventional symbols have been used to represent various logic and circuit functions. The symbols employed are set forth in FIGS. 2A through 2K. Any number of specific circuit configurations may be developed by those skilled in the art to perform the functions designated by the various circuit symbols. Specific circuits have not been illustrated or cited except in rare instances where the convenience of the reader would seem to be served thereby.

In the circuit schematic, output and input signals are negative with respect to ground, therefore any increase in voltage means that the voltage becomes less negative or approaches zero. The input and output signals are considered to be "on," designated by a "one" state, for voltages that are negative, and "off," designated by a "zero" state for voltages substantially zero. Signals are considered to be the inverse of one another when one signal is "zero" and the other is "one" or vice versa.

Consider the four logic elements depicted in FIGS. 2A through 2D. The symbol in FIG. 2A represents the "OR" function. The OR circuit is arranged to provide an output signal when there is an input signal at either of the input terminals. Thus, if either the upper or lower terminal has a "one" there will be a "one" output. The inverted OR gate in FIG. 2B functions in a similar manner; however, in this case, the small circle at the output indicates inversion and consequently, when there is a signal on either input terminal, there will be no signal on the output terminal.

Figure 2C:
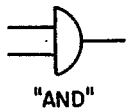
Figure 2D:
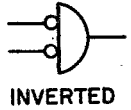

FIG. 2C represents an "AND" function wherein the circuit is arranged to provide an output signal when there is an input signal at each input terminal. In other words, when the input on each input terminal is a "one" there will be a "one" output. The inverted AND element in FIG. 2D functions similarly; however, the inversion denoted by the small circle on each input lead indicates that when no signals are present on all terminals, there will be an output.

Figure 2E:
Figure 2E:
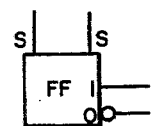

FIG. 2E is the symbol used for an amplifier. As indicated by the small circle on the input terminal of this amplifier symbol, the state of a signal transmitted through such an amplifier is inverted.

FIG. 2F illustrates a flip-flop. When a signal is applied to either of the set "S" terminals, the stage assumes a "one" state and an output signal appears at the "1" terminal. This signal is maintained after the set signal is removed until a second signal is applied at either of the reset "R" terminals. Under the influence of a reset signal, the stage assumes a "zero" state and an output signal appears at the "0" terminal which is maintained after the reset signal is removed until another set signal is applied. If both set and reset signals are simultaneously applied, the output signal from both the "1" and "0" outputs is removed.

Figure 2G:
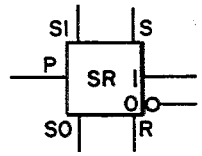

A shift register stage is illustrated in FIG. 2G. This symbol represents a single stage of a plurality of stages, such as used in the start-up address circuit in FIG. 6. The stage operates in a manner similar to the flip-flop, set "S" and reset "R" signals being operative to produce an output signal on the "1" and "0" output terminals respectively. In addition, with the stage in the zero state, an input on terminal "S1" plus a pulse on terminal "P" will cause a change to the one state. Further, an input signal on terminal "S0" plus a pulse on terminal "P" will cause a change to the zero state.

Figure 2H:
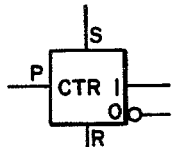

The counter stage shown in FIG. 2H is similar to the shift register stage. A distinction lies in the fact that the controlled set and reset terminals, "S1" and "S0" are internally connected to the input terminal "P" and consequently, every time a positive voltage transition is applied to terminal "P," the state of the counter is changed. As in the previous cases, signals applied to the set "S" and reset "R" terminal are effective to place the counter stage in a one or zero state respectively.

Figure 2I:
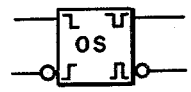

FIG. 2I illustrates the symbol used for a "one-shot" multivibrator. Essentially, it is a monostable multivibrator having an astable period (sometimes cited within the symbol) adjusted in accordance with the needs of the circuitry it supplies. In response to a negative voltage transition on the upper left hand input terminal, the one-shot multivibrator produces a gating pulse on the upper output terminal which is negative and on the lower output terminal which is positive. In response to a positive voltage transition on the lower input terminal, this same output is made available.

Figure 2J:
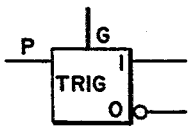

FIG. 2J illustrates the symbol used for a trigger source and it will be understood that in response to the application of a pulse on input terminal P an output signal appears on output terminal "1." Under normal conditions, a signal output appears on output terminal "0" and this is modified only by the application of a signal to input terminal P. The presence of a signal on gate terminal G is effective to inhibit the effect of a signal on input terminal P and consequently, the trigger will retain its original state, i.e., no signal on output "1" and a signal on output "0."

Figure 2K:
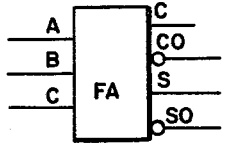

FIG. 2K illustrates the full adder element used in the illustrative embodiment of the invention as a portion of the binary comparator circuitry. The storage of information in such elements and their operation in response thereto has been described in the co-pending patent application of K. R. Thompson, Serial No. 159,264, filed December 14, 1961. Each element receives three input signals A, B and C (a first and second number and a carry signal) and produces four output signals S, S0, C, C0 (set to one, set to zero, carry, and no carry). The application of an input to either terminal A or B is effective to set the stage to one and produce a signal on the set S output. If signals are applied to both terminals A and B simultaneously, the full adder element will be set to zero producing signals on outputs S0 and C. In the event that the carry input terminal C is energized by a preceding stage simultaneously with an input on either input terminal A or B, the element will again be set to zero and a carry pulse generated. In the remaining case when all three input terminals are energized, the element will be set to one and a carry pulse generated.

FIGS. 3 through 14 when positioned as shown by the sheet layout of FIG. 1A present a complete circuit schematic of the basic circuits employed in an illustrative embodiment of the invention. The various elements throughout this circuit bear descriptive notations having two distinct portions. A numerical prefix denotes the figure upon which the element appears and an alphabetical suffix is generally descriptive of the function performed by the particular circuit element. For example, Element 3MDSP appears in FIG. 3 and is the measured deviation register shift pulser. The lead designations also bear numerical prefixes indicative of the figure in which they originate. In order to minimize the number of leads interconnecting each sheet of drawing, a cable 100 has been used. Generally, when a lead must connect elements appearing in different figures, the lead is shown entering the cable at its point of origin and emerging again in the figure containing its point of destination.

In the following, the circuit components and functioning will be described by considering in time sequence the operations performed both by an operator and the automatic control system. Generally speaking, after an operator has inserted data concerning the expected entry gage $H_i$ and the desired output gage $H_o$ into a push-button panel, the control system is turned on and all subsequent operations are automatic. This fact is clearly shown by the detailed description.

*Manual insertion of expected entry gage and desired output gage*

The expected entry gage $H_i$ and the desired output gage $H_o$ are inserted into the system by means of a push-button panel shown in FIG. 5. The push-buttons are arranged in columns containing ten sets of push-buttons for discretely registering a number from zero to nine. In order to register decimal numbers having the orders of tenths through hundreds, four columns of push-buttons are provided for each gage number to be registered. Two complete arrays are provided to register both the entry gage and the output gage and for convenience, the arrays are grouped with the columns for each decimal digit adjacent to one another. Thus, the columns for registering the tenths digit of both the entry gage and output gage are illustrated together. Only one column of each array is shown because the connections in each column are identical. The columns in FIG. 5 are labeled "left" and "right" and the numbers registered therein represent the gage at the left and right of the mill respectively. Whether the numbers are entry or output gages depends upon the direction of operation.

Each column of push-buttons is wired between a ground connection in FIG. 5 and multiplex units in FIG. 7 by four leads, for example, leads 5-21, 5-22, 5-24, and 5-28, associated with the left column of the tenths digit. These leads are selectively conditioned in accordance with the set of buttons depressed to represent the number thereof in binary coded form; the order of the binary digit represented by each lead being the same as the rightmost digit of the lead designation. Depressing any set of buttons is effective to selectively remove the ground connection from those leads normally considered to exhibit a "1" state in a standard 1-2-4-8 binary-coded-decimal notation for the number of the depressed set. Another acceptable arrangement would employ selectively placing a negative voltage on the leads considered to exhibit a "1" state.

Consider the selection of number 7 in the second column. In this instance, leads 5-11, 5-12, and 5-14 are removed from the ground connection appearing in the upper portion of the figure whereas lead 5-18 remains associated therewith. If the last digit of the lead notation is taken as the weighting of that lead from a binary standpoint, the number 7 is represented by the states on leads 5-11, 5-12, 5-14, and 5-18 as "1 1 1 0." By similar circuitry, each column of push-buttons establishes the conventional binary designation upon the output leads for the number registered.

By depressing the appropriate push-buttons, the expected entry gage and desired output gage are consequently registered in the gage preset panel. This preset information in binary-coded-decimal form is transmitted via multiplex units illustrated across the top of FIG. 7 to the Sample Time Counter wherein the information is used to establish the predetermined time "$t$" shown in Equation 4 and used in calculating the required input deviation $\Delta H_{ir}$ to insure gage output. The Sample Time Counter also functions to convert the entry gage information which is now in binary-coded-decimal form into straight binary form for insertion in the Deviation Calculation Counter. This functioning is considered more completely hereinafter.

With the expected entry gage and desired output gage information preset into the system, it is necessary to adjust the actual measuring gage 3-04 or 3-05 so that it will directly read the deviation of entry gage from the expected value. Numerous commercially available gages may be used to provide such data. For purposes of description, it has been assumed that gages are used which provide the deviation information in analog form and consequently, an analog-to-digital converter 3-03 is used to translate it into binary form.

*Start-up operation*

When each column of the push-button panel of the gage preset has a digit selected, a negative potential is applied to conductor 5-01. Until this condition is met, no operations may proceed. After the condition is met, this negative potential is applied to enable the push-button permissive trigger 9PBPT in FIG. 9 to initiate operations. Conductor 5-01 enters cable 100 in FIG. 3 and emerges in FIG. 9 to be connected to terminal P of 9PBPT. In response to the negative voltage on terminal P thereof, push-button permissive trigger 9PBPT provides a substantially zero voltage to the gate terminal of on trigger 9ONT.

Figure 9:
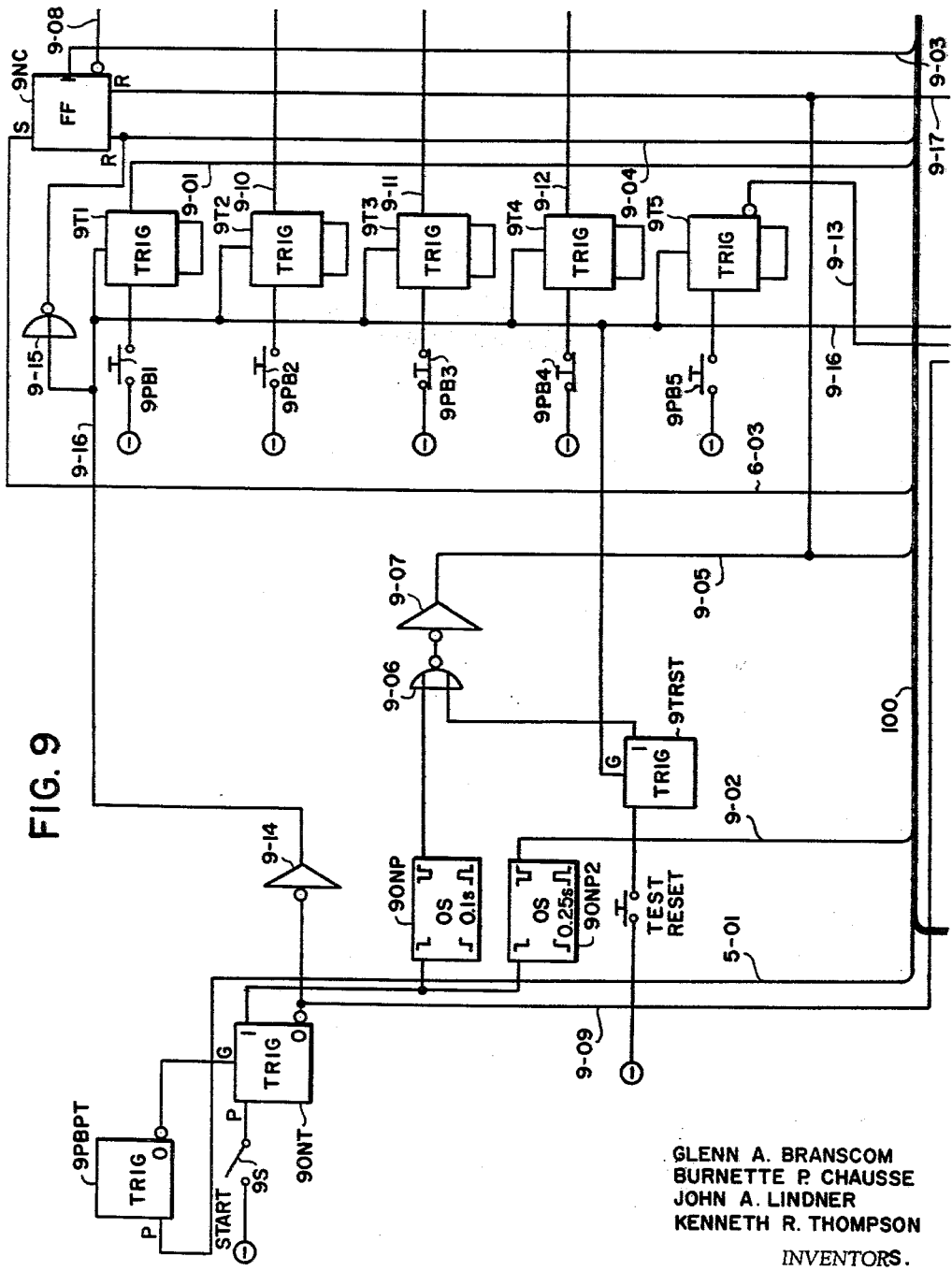

Automatic operation starts by operating the start selector switch 9S in the upper left quadrant of FIG. 9. This connects a negative voltage to the P terminal of on trigger 9ONT and this, in turn, is effective to produce a negative level or signal at output terminal 1 and a positive level or signal at output terminal 0. The output from terminal 1 is applied to the upper input terminal of one-shot multivibrator 9ONP in order to generate a negative output pulse for resetting the system in preparation for receipt of the new input information.

The output from on-pulser 9ONP is used to reset and enable the Start-Up Address circuit in FIG. 6 which prepares the system to begin calculation and generation of control signals upon movement of the mill. The negative pulse from on-pulser 9ONP is transmitted through inverting OR gate 9-06, logic amplifier 9-07, and conductor 9-05 to the reset terminals of all stages of the Start-Up Address shift register in FIG. 6, except the first, 6SA1. Stage 6SA1 has its set terminal S connected to the reset lead and consequently assumes a one state while all other stages are reset to zero states.

Other effects of the negative pulse on conductor 9-05 include: resetting normal cycle flip-flop 9NC to zero; resetting all of the counter elements 13EG1 through 13EG9 of the entry gage storage counter to zero in preparation for the storage of the expected entry gage storage number; and triggering of the one-shot multivibrator 4SUP1 over conductor 6-10 which generates signals for initiating stepping of the Start-Up Address shift register in FIG. 6, as considered hereinafter.

Further reset operations and preparation of the circuit for operation are performed under the control of the start-up shift register in FIG. 6. Shifting of this register is controlled by the one-shot multivibrators 4SUP1 and 4SUP2 in conjunction with several logic gates. The start-up pulsing multivibrators 4SUP1 and 4SUP2 are interconnected to provide a zero output pulse for application to the start-up pulse gate 4–03 having a duration of one-tenth of a second and an inter-pulse period of one-tenth of a second. The generation of such a pulse is in response to the reset signal connected via conductor 9–05 and conductor 6–10 to the lower input of multivibrator 4SUP1. Upon termination of the reset pulse, multivibrator 4SUP1 generates a negative pulse at the upper terminal thereof which is applied to the lower input terminal of multivibrator 4SUP2. Upon termination of this pulse, multivibrator 4SUP2 generates a positive impulse at the lower output terminal thereof for application to multivibrator 4SUP1. Upon termination of this pulse, multivibrator 4SUP1 is again switched and provides a negative output pulse at its upper terminal and a positive output pulse at its lower terminal. The positive output pulse from multivibrator 4SUP1 is applied as one of the inputs to the start-up pulse inverting AND gate 4–03. Due to the tandem connection of these multivibrators, the condition recurs as described above, producing a one-tenth second zero condition at the input of the gate at intervals of one-tenth of a second.

The other three inputs to the start-up pulse gate 4–03 serve to insure that an initial start-up time has elapsed and that a normal cycle is to ensue. These conditions are met by a first input on conductor 9–02 associated with the output from one-shot multivibrator 9ONT2 which assumes a zero condition 0.25 second after receipt of the start-up signal; a second signal on conductor 9–03 which is associated with the one output of normal cycle flip-flop 9NC and is in a zero condition when the flip-flop has been properly reset; and a third signal on conductor 9–04 which is connected via amplifier 9–14 and inverter 9–15 to the inverse output of on trigger 9ONT and resides in a zero state while 9ONT is energized by 9S.

Thus, when a minimum of 0.25 second has elapsed and start-up pulse multivibrator 4SUP1 provides its next zero conditioning of the output, an output signal is generated on conductor 4–04 at the output of start-up pulse gate 4–03. This signal recurs every 0.2 second. The signal from start-up pulse gate 4–03 is used to generate a shift pulse to shift the "one" state which was initially set into the first stage 6SA1 of the start-up shift register through successive stages thereof and thereby to provide enabling signals for a sequence of operations.

The signal which appears repetitively at the output of the start-up pulse gate 4–03 on lead 4–04 is applied to the start-up address shift register in FIG. 6 through a plurality of gates and one-shot multivibrator 4DIP. The circuit specifically includes inverting OR gates 4–05 and 4–06 in parallel, supplying inverting AND gate 4–07 which in turn drives the upper input of deviation-interval-pulse multivibrator 4DIP. The inverse output of multivibrator 4DIP is applied through inverting amplifier 4–09 to a reset lead 4–10 which is connected to reset each of the counter elements 4–11 through 4–20 in the Deviation Interval Counter disposed across the upper portion of FIG. 4. In addition, lead 4–10 is connected to the pulse inputs of the start-up shift register in FIG. 6 and thus applies a shifting pulse to each shift register element 6SA1 through 6SA5. In view of the circuit arrangement, it will be obvious that the first output from the start-up pulse gate 4–03 is effective to reset the Deviation Interval Counter to zero and cause the shift register to take its first step.

The inverting OR gates 4–05 and 4–06 provide alternate means for utilization of the one-shot multivibrator 4DIP. During start-up sequence, these inverting OR gates permit use of the multivibrator to pulse the start-up shift register. Under normal operating conditions, the inverting OR gates apply appropriate pulses from the Deviation Interval Counter to the one-shot multivibrator 4DIP to step the actual entry gage deviation information along in the Measured Deviation Register appearing in FIG. 3 in a synchronism with flow of material through the mill. The inverting AND gate 4–07 insures that the initiating pulse from on-pulser 9ONP has terminated before the start-up sequence progresses. This explains the function of lead 4–08 interconnected via conductor 6–10 and conductor 9–05 to on-pulser 9ONP.

The start-up address shift register in FIG. 6 operates in response to the shifting pulses on lead 4–10 to provide control signals on leads 6–11, 6–01, 6–02, 6–03, and 6–04 in timed sequence. The actual stepping follows conventional operation and may be understood by considering the stepping of the "one" state initially set into shift register stage 6SA1. The set-to-one input lead S1 and the set-to-zero input lead S0 are permanently energized by connection to ground and a negative source respectively. This energization insures that the stage will assume a zero state upon application of a pulse to its P triggering terminal. Because stage 6SA1 is initially in a one state and the "1" output is connected to the set-to-one input of the second stage 6SA2, the second stage is prepared to assume a "one" state upon application of a triggering pulse to its input terminal P. Thus, upon application of the first shift pulse, the "one" is transferred from the first to the second stage of the shift register. As successive shift pulses are applied, this "one" condition is shifted through successive shift register stages until it is ultimately in the last stage 6SA5. A succeeding pulse will cause stage 6SA5 to resume the zero state and terminate the start-up sequence of operations.

As succeeding stages assume the one condition, discrete signals appear on the output leads associated therewith which are used to control the storage of the necessary data into the various subcircuits of the system. The particular utilization of each of these signals will appear in conjunction with the description of particular operations.

*Translation of expected entry gage into straight binary form*

When the mill is operating in forward direction, the expected entry gage is preset in the lefthand push-button array of the gage preset shown in FIG. 5. Before the mill operates it is necessary to translate the push-button conditions from the decimal form employed, first into a binary-coded-decimal form for use in the binary-coded-decimal countdown Sample Time Counter in FIGS. 7 and 8, and then into a straight binary form which may be used in the calculation of the desired entry gage deviation $\Delta H_{lr}$. The first translation from decimal to binary-coded-decimal form, as explained above, is accomplished by appropriate wiring of the push-button arrays. The second translation of the binary-coded-decimal data into straight binary form is accomplished by counting down the Sample Time Counter while simultaneously counting up a normal binary counter. The normal binary counter used, is the Entry Gage Storage and appears vertically disposed at the left of FIG. 13. When the Sample Time Counter reaches a zero condition, counting is stopped and the number registered in the Entry Gage Storage Counter is identical to that which was originally arranged in decimal form by the gage preset push buttons. The actual circuitry required in order to accomplish these translation operations will now be examined.

When the start-up shift register has progressed to the point at which the second stage 6SA2 has assumed a one state, output lead 6–11 will exhibit a zero condition. This condition is applied to the input of inverting AND gates 6–12 and 6–13 which control the entry of data from the push-button gage preset array of FIG. 5 into the Sample Time Counter in FIGS. 7 and 8. Additional inputs to inverting AND gates 6-12 and 6-13 are respectively available over conductors 11-17 and 11-16 from the forward reverse trigger 11FRT, the state of which is indicative of the rolling direction. It will be recalled that when the rolling direction is forward, trigger 11FRT presents a zero signal on lead 11-17 whereas when the rolling direction is reverse, trigger 11FRT presents a zero condition on lead 11-16. Under the assumed conditions of forward operation, the signal on lead 11-17 enables inverting AND gate 6-12 to produce an output when shift register stage 6SA2 is placed in a one state. The output from inverting AND gate 6-12 is applied to inverting OR gate 6-14 which, in response thereto, triggers the one-shot multivibrator 6SLP to produce a set pulse for gating the digital information appearing on the left push-button columns into the Sample Time Counter. It will be recalled that the left columns register the expected entry gage data.

The actual gating is accomplished by the circuitry connected to the lower output terminal of multivibrator 6SLP comprising inverting amplifier 6-15, conductor 6-06, and multiplex units 7-01 through 7-04. Before gating the entry gate information in, however, the Sample Time Counter is first reset to zero. One-shot multivibrator 6RSCP is triggered simultaneously with the setting multivibrator 6SLP to accomplish the reset function. The astable period of multivibrator 6RSCP is shorter than that of 6SLP to permit the reset function to terminate before the set function terminates. The actual reset signal is generated at the lower output terminal of multivibrator 6RSCP and is applied via inverting amplifier 6-23 and conductor 6-05 to the reset terminals of the individual stages of the Sample Time Counter. Because the counter is arranged for binary-coded-decimal counting, OR gates, e.g. 7-06, are inserted before the reset terminals of several stages in each decade. The function of these OR gates is to restrict the counting action to ten, rather than the sixteen discrete steps available with four binary counters.

After resetting the Sample Time Counter, the negative signal imposed on conductor 6-06 by the set-left-pulser 6SLP is effective to gate the data on the leads, e.g., 5-21, 5-22, 5-24, 5-28, in the left columns of the gage preset push-button array through the multiplex units and into the Sample Time Counter. The multiplex units 7-22 through 7-25 are merely gating circuits operative in response to a negative signal on either gate lead 6-06 or 6-07 to selectively condition the output leads therefrom in accordance with the signal condition on the input leads from the left or right associated column respectively. Thus, the negative signal on conductor 6-06 gates the expected entry gage $H_t$ into the Sample Time Counter.

Figure 12:
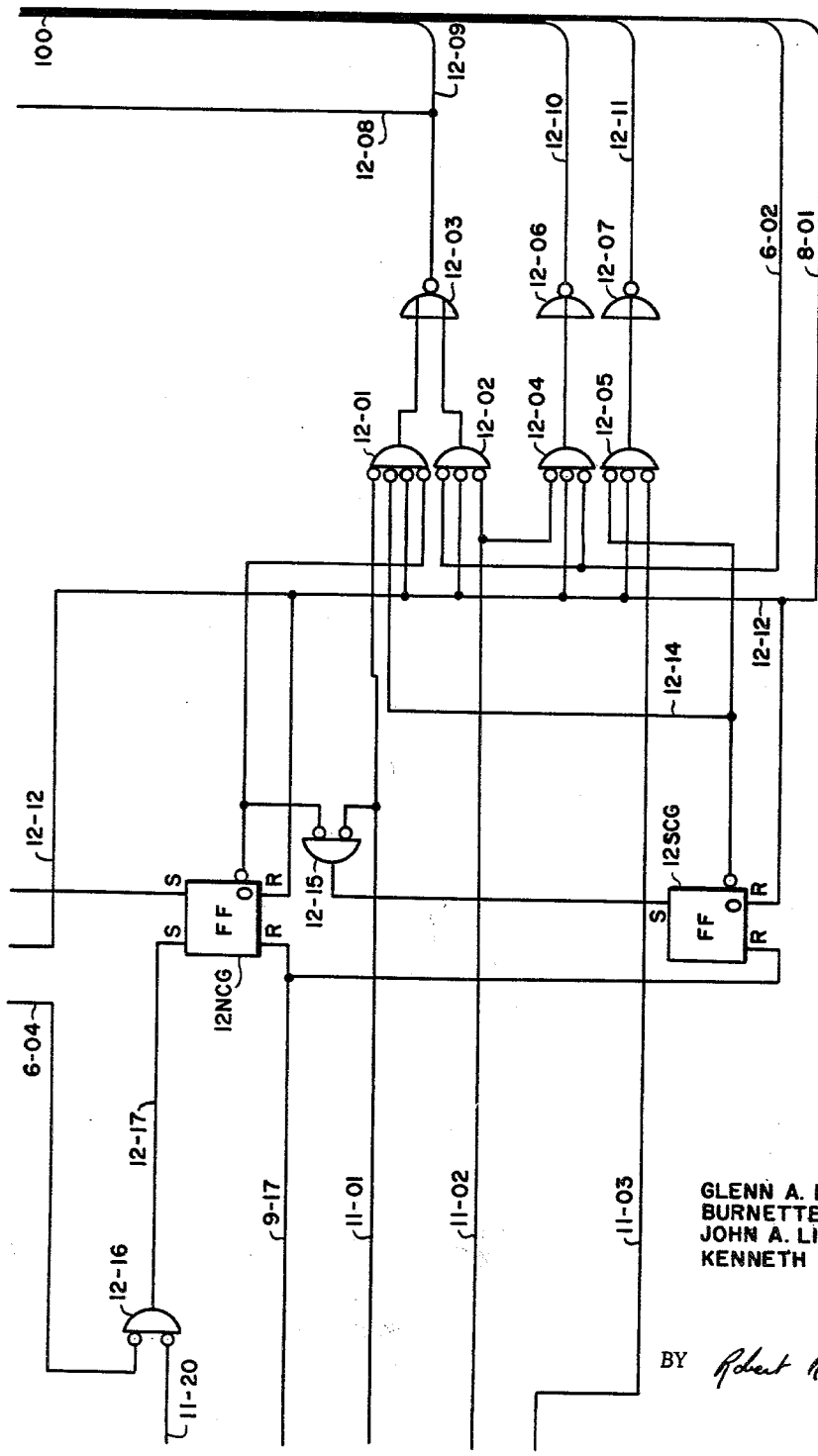
Figure 13:
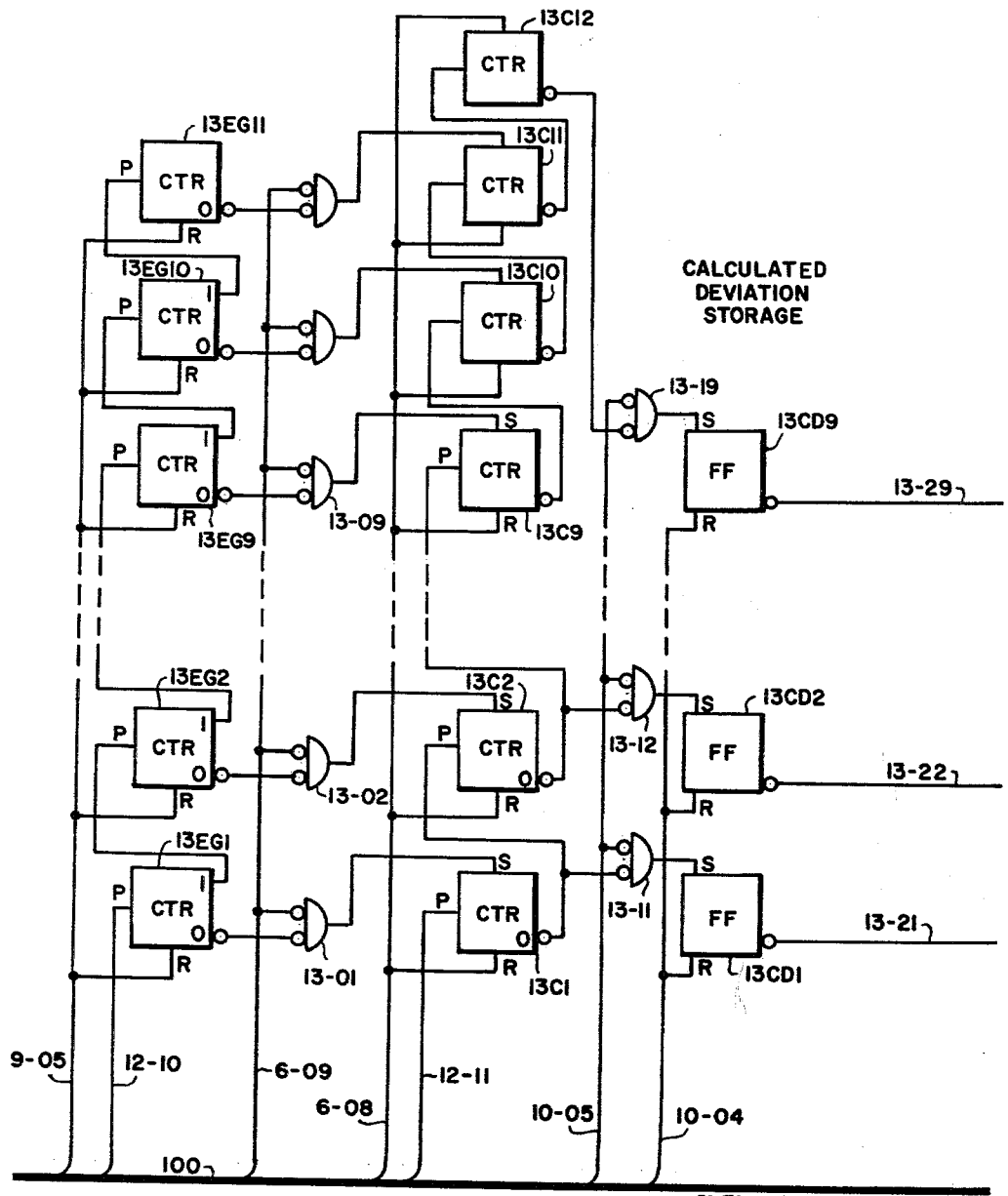
Figure 14:
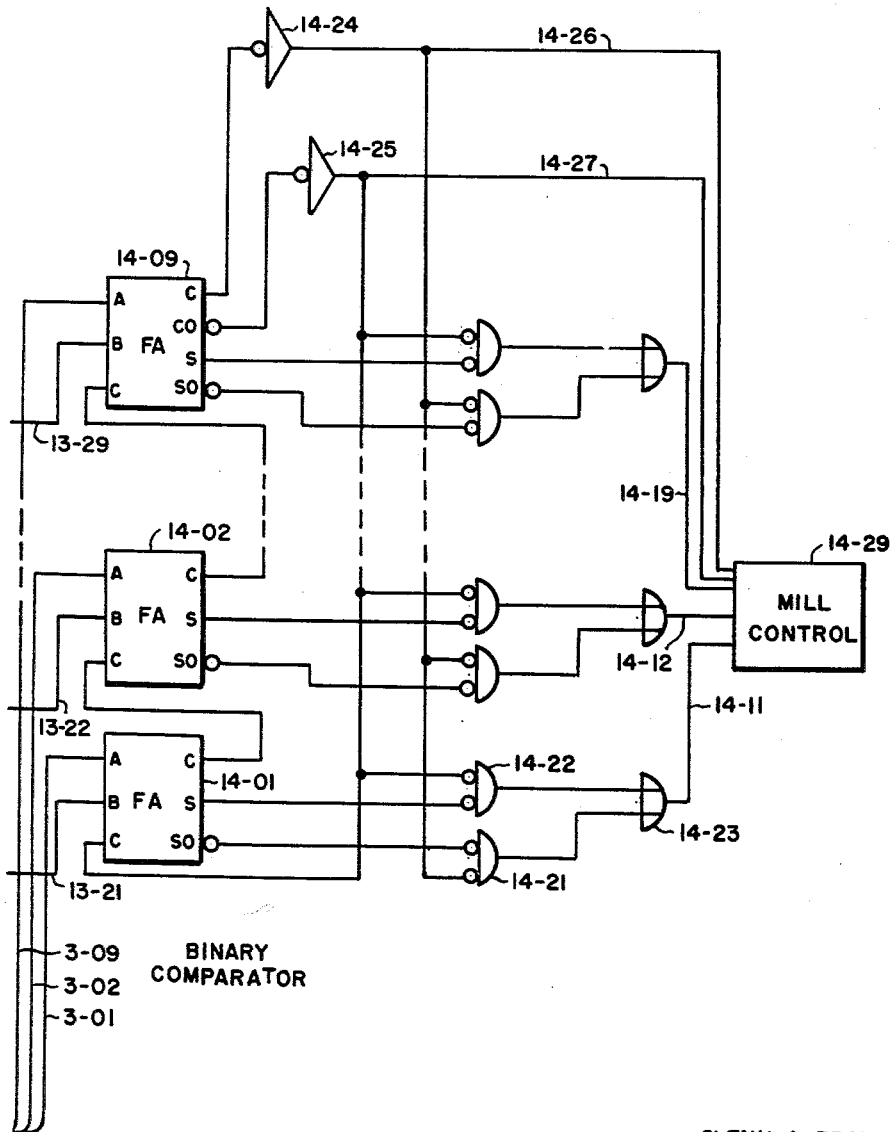

When the start-up address shift register in FIG. 6 proceeds to the point of a one state in the third stage 6SA3, output lead 6-02 assumes a zero condition which initiates the transfer of the expected entry gage information in the Sample Time Counter into the binary Entry Gage Storage Counter in FIG. 13. Lead 6-02 enters cable 100 and reappears in FIG. 12 wherein it applies the zero signal thereon to the counting-pulse inverting AND gates 12-02 and 12-04. These gates each have two additional inputs, one from the test-and-compute pulse generator 11TACP, and another from the zero sensing amplifier 8ZSA associated with the Sample Time Counter. Considering the latter input first, its function is to provide a zero signal at the input of the gates over conductor 8-01 at all times except when the Sample Time Counter is in a zero state. As described hereinafter, only when the Sample Time Counter in FIGS. 7 and 8 registers zero will the one state appear on conductor 8-01. Obviously, a one conditioning of lead 8-01 will inhibit any signals from passing through inverting AND gates 12-03 or 12-04.

Figure 11:
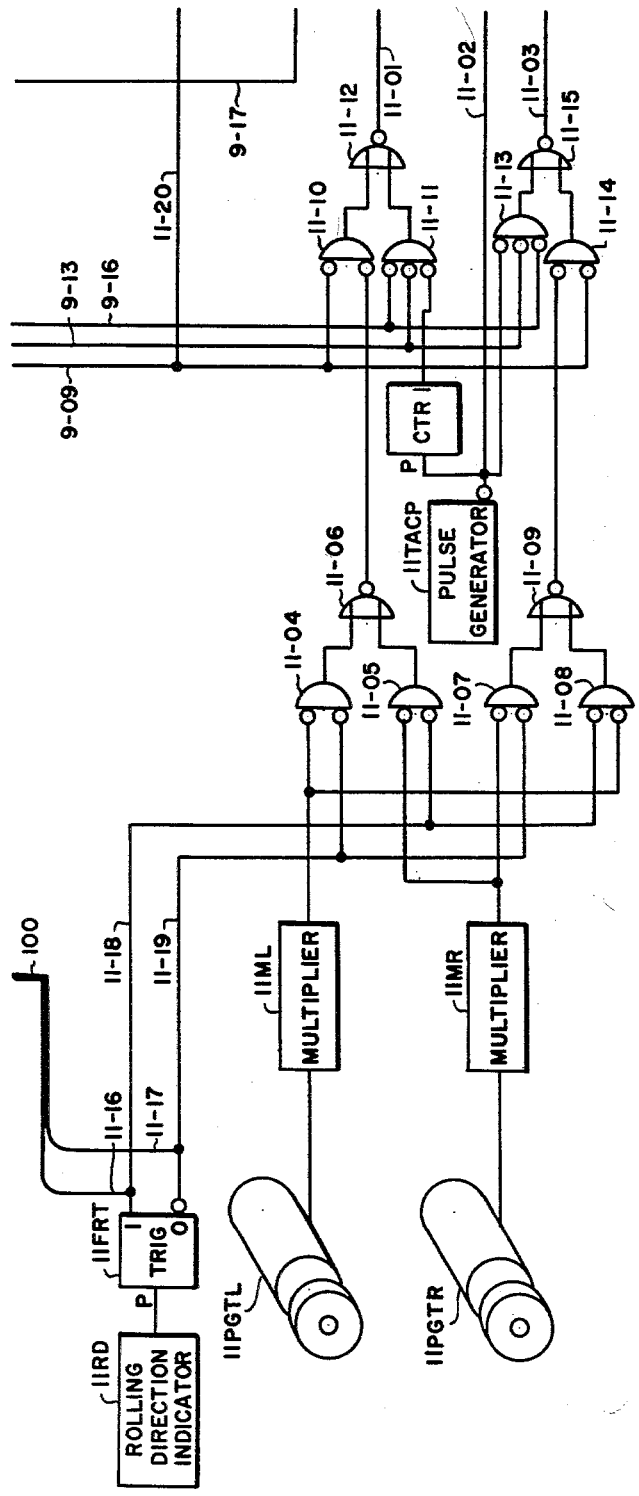

The test-and-compute pulse generator 11TACP in FIG. 11 produces a train of pulses at a frequency, for example, of 20 kilocycles, which is used to initially condition the system and in some circumstances, for testing purposes. This train of pulses is applied over conductor 11-02 to an input of inverting AND gates 12-02 and 12-04. When all three inputs on either of these AND gates is zero, they will yield an output signal of a one state. These inputs are available each time generator 11TACP produces a pulse during the period that the Sample Time Counter contains a count and the third shift register stage 6SA3 is in the one state.

The output from inverting AND gates 12-02 and 12-04 is applied respectively through inverting OR gates 12-03 and 12-06 to conductors 12-09 and 12-10 for simultaneous application as countdown pulses to Sample Time Counter and countup pulses to the Entry Gage Storage Counter.

Lead 12-09 enters cable 100 and reappears in FIG. 7 wherein it is connected to the first counter in the tenths decade of the Sample Time Counter. The operation of the counter in response to the plurality of pulses applied over lead 12-09 is that of a normal countdown counter and this operation progresses until a complete zero condition is achieved. The specific countdown operation will be considered shortly. Conductor 12-10 merges with cable 100 and reappears in FIG. 13 wherein it is connected to the first counting element 13EG1 of the Entry Gage Storage Counter. In response to the pulses on lead 12-10, the Storage Counter counts up in binary fashion as long as pulses are applied. The circuit of the Entry Storage unit is considered subsequently.

Figure 8:
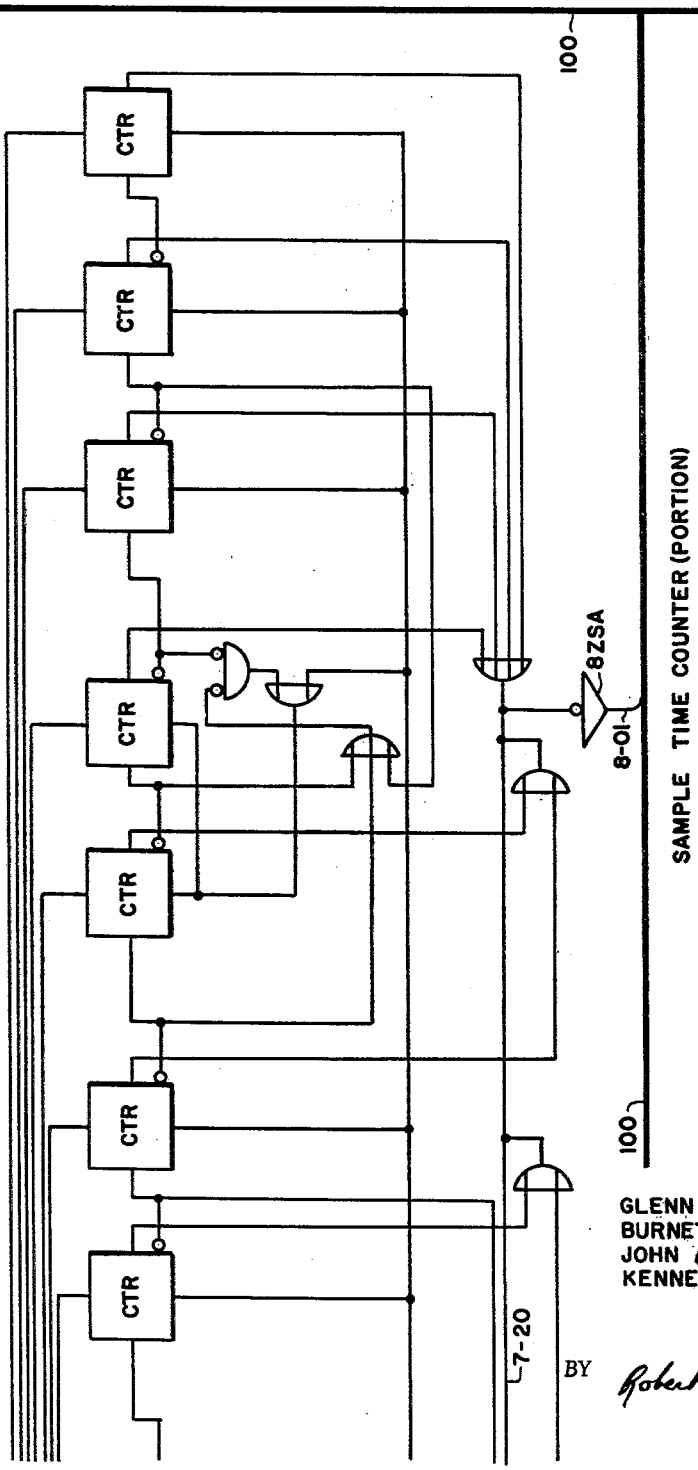

The Sample Time Counter appearing in FIGS. 7 and 8 may be fabricated in any number of forms; however, the particular form illustrated combines four separate bistable stages to yield ten discrete permutations of states. In the particular instance, the tenths counter decade comprises stages 7-01, 7-02, 7-04, and 7-08 with an output transferred to the pulse input P of successive stages when the preceding stage changes from a zero to a one state. Inasmuch as bistable elements are used, the four stages are capable of assuming sixteen discrete permutations of state. In order to limit the number of discrete permutations to ten, a selective gating arrangement has been included to reset several of the stages upon occurrence of a particular permutation. The gating arrangement comprises an inverter 7-03, a four-input inverting AND gate 7-05, and two-input OR gate 7-06. The inputs to the inverting AND gate 7-05 comprise the zero output terminals of stages 7-01, 7-02, and 7-08 and the one output of stage 7-04 after inversion by inverter 7-03. When all stages of the first decade are in a one state, inverting AND gate 7-05 yields an output which is applied via OR gate 7-06 to reset stages 7-02 and 7-04. This yields a final permutation of 1 0 0 1 for the entire counter decade. Under these conditions, the next pulse applied to count down the decade on lead 12-09 will be effective to change the state of counter 7-01 to zero and yield the complete permutation of 0 0 0 1.

Additional logic gates are provided to yield a discrete indication when all stages of the decade are zero. In the first decade, these gates include OR gate 7-07, inverter 7-09, and OR gate 7-10. The inputs to OR gate 7-07 include the "1" outputs of the first and second counter by two inverters 7-03 and 7-09. The outputs of OR gates 7-10 comprise the "1" output of stage 7-08 and the "1" output of stage 7-04. The latter output is first processed by two inverters 7-03 and 7-09. The outputs of OR gates 7-07 and 7-10 are connected to a common line 7-20 which is effectively a zero sensing lead. Whenever any stage of the first or a subsequent decade is in a one condition, zero sensing lead 7-20 will have a negative or one state thereon. When all stages are in the zero condition, zero sensing lead 7-20 will be in a zero condition also, and thus discretely indicate the empty condition of the counter. Zero sensing amplifier 8ZSA appearing in FIG. 8 is effective to invert the signal condition on lead 7–20 and apply it over lead 8–01 and cable 100 to strategic points in the circuitry. This signal condition, as already pointed out, is used to control entry of information into the Entry Gage Storage Counter in FIG. 13 and, as will be subsequently illustrated, this signal is used to establish the sample time required in calculating the required input gage deviation $\Delta H_{ir}$.

The Entry Gage Storage Counter in FIG. 13 may also take many conventional forms. It is a straight binary counter. As illustrated, the counter comprises a plurality of counting units having the one output of preceding stages connected to apply an input pulse to the succeeding stages whenever the preceding stage changes from a one to a zero condition. For example, the one output of the initial counter stage 13EG1 is directly connected to the P input of the second counter stage 13EG2. For convenience, the intermediate counting stages have been represented merely as dotted lines and only the first two stages 13EG1 and 13EG2 and the last stage 13EG9 have been shown. It will, of course, be understood that any number of stages may be employed, the only limitation being the magnitude of the number to be recorded.

In recapitulation, under the control of the start-up address shift register in FIG. 6, the digital information representative of the expected gage has been transferred from the left push-button array of the gage preset unit in FIG. 5 into the Sample Time Counter in FIGS. 7 and 8 and thereafter transferred to the Entry Gage Storage Counter in FIG. 13.

*Setting the deviation calculation counter*

When the third stage 6SA3 of the start-up address shift register in FIG. 6 resumes its zero state in response to the third shifting pulse, the one output experiences a positive voltage transition which is applied via conductor 6–01 to reset the Deviation Calculation Counter in FIG. 13 and subsequently to gate the expected entry gage data from the Entry Gage Storage Counter into the Deviation Calculation Counter.

Figure 10:
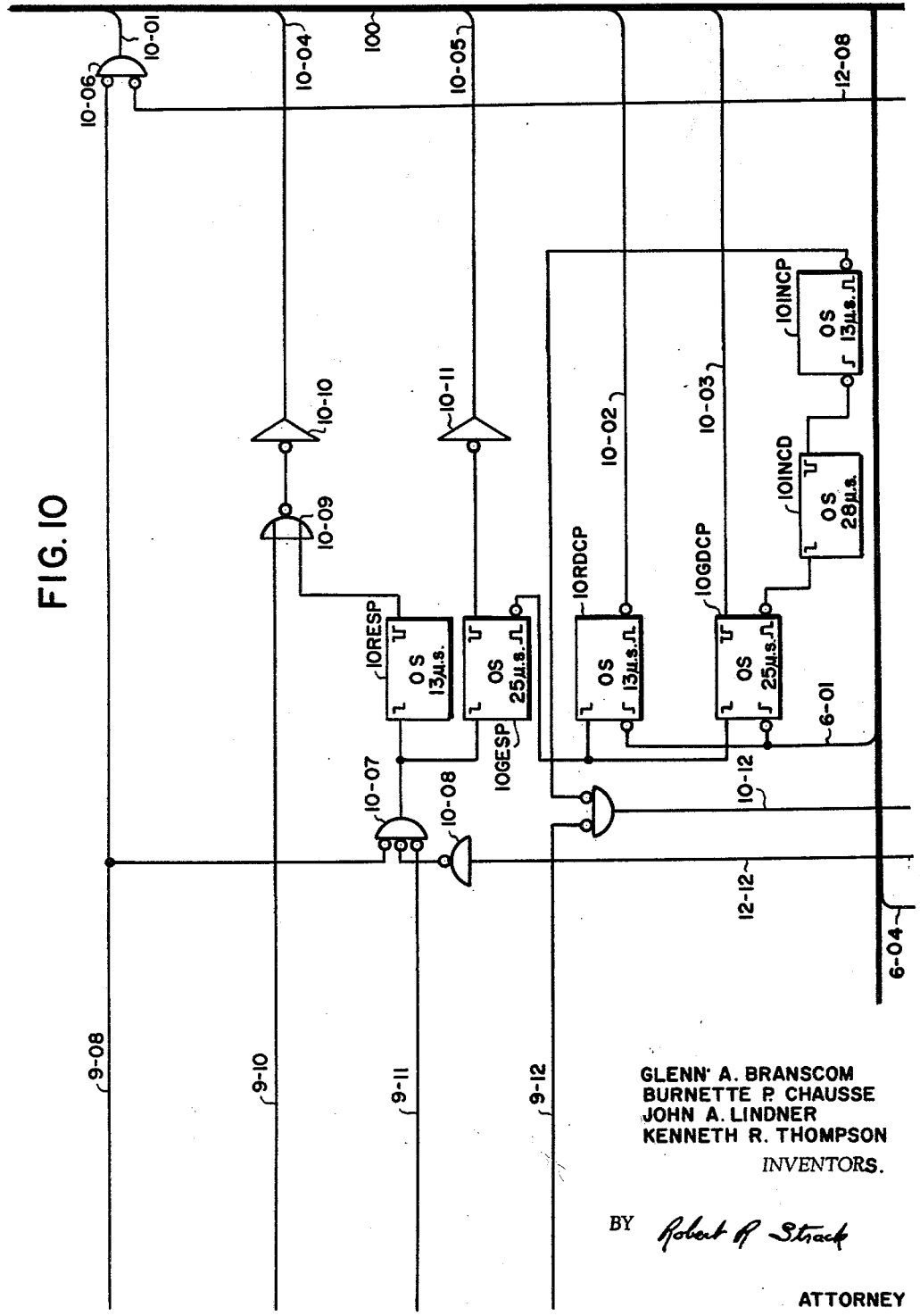

Lead 6–01 merges with cable 100 and reappears in FIG. 10 to apply the positive voltage transition to the lower input terminal of one-shot multivibrators 10ADCP and 10GDCP. The function of the former multivibrator is to produce a reset pulse for the Deviation Calculation Counter and that of the latter multivibrator is to produce a gating pulse to permit the information stored in the Entry Gage Storage Counter to set the Deviation Calculation Counter.

In response to the signal from the start-up shift register, one-shot multivibrator 10RDCP produces a 13 micro-second positive pulse on its lower output lead 10–02 which is applied via the inverting logic amplifier 6–16 in FIG. 6 and lead 6–08 to the reset terminals of each counter element in the Deviation Calculation Counter in FIG. 13. Simultaneously, multivibrator 10GDCP produces a 25 microsecond negative impulse on its upper output terminal which is applied via lead 10–03, inverting logic amplifier 6–17, and lead 6–09 to enable the plurality of inverting AND gates 13–01 through 13–09 which interconnect the zero output terminals from each stage of the Entry Gage Storage Counter and the set terminals of each corresponding stage of the Deviation Calculation Counter.

Because the duration of the reset pulse is less than the duration of the gating pulse, the Deviation Calculation Counter is first reset to zero and thereafter the gating pulse on the inverting AND gate 13–1 transfers the signal condition appearing on the zero output terminals of the Entry Gage Storage stages to the set terminals of the Deviation Calculation Counter units. Of course, the effect of the setting impulse from the preceding storage units is to store the expected entry gage into the Deviation Calculation Counter.

*Transferring the desired output gage to the sample time counter*

Prior to commencement of calculation, the desired exit gage must be inserted in the Sample Time Counter. This is facilitated also by means of the gating pulse from multivibrator 10GDCP. The negative pulse on lead 10–03 from multivibrator 10GDCP is inverted by inverter 6–18 and applied to enable inverting AND gates 6–19 and 6–20. The function of these inverting AND gates, is similar to that hereinbefore considered with respect to the setting of the Sample Time Counter with the expected entry gage, namely, they selectively control the multiplex units in FIG. 7 to gate the signals from either the left or right push-button arrays into the Sample Time Counter.

Inverting AND gates 6–19 and 6–20 each have a second input from the forward-reverse trigger 11FRT. It will be recalled that when mill operation is in a forward direction, trigger 11FRT supplies a zero condition on lead 11–17 and when mill operation is in a reverse direction, trigger 11FRT supplies a zero signal condition on lead 11–16. Accordingly, for the assumed forward operation AND gate 6–20 has a full complement of inputs and, therefore, provides an output signal via an inverting OR gate 6–21 to the lower input terminal of one-shot multivibrator 6SRP. The function of multivibrator 6SRP is to initiate reset of the Sample Time Counter, and thereafter enable the multiplex units in FIG. 7 to gate the information registered in the right push-button arrays into the individual counter stages. This is accomplished by producing a positive gating pulse of approximately 25 microseconds and applying it through inverting amplifier 6–22 to both the resetting multivibrator 6RSCP and the multiplex units in FIG. 7. When inverted, the initial voltage transition from multivibrator 6SRP switches the reset multivibrator 6R1CP which produces a 13 microsecond reset pulse at the lower output terminal thereof. This reset pulse is applied to the reset terminals of each Sample Time Counter unit in a circuit comprising inverting logic amplifier 6–23 and lead 6–05.

Because the duration of the output from multivibrator 6SRP is greater than that from the reset multivibrator 6RSCP the gating signal applied over lead 6–07 to the multiplex units in FIG. 7 enables gating the desired exit gage value into the Sample Time Counter.

*Insertion of actual entry gage*

The actual deviation of the input material from the expected gage $\Delta H_i$ must be stored in the system in order to provide a comparison with the calculated required input deviation $\Delta H_{ir}$. Prior to mill operation, the deviation of the input measuring gage (3–04 or 3–05) at standstill, is transferred into the Measured Deviation Register appearing in FIG. 3. This register comprises a plurality of magnetic more shift registers, each shift register handling one binary digit. The gage deviation is converted into binary form and loaded into the first magnetic core of each shift register. The register illustrated in FIG. 3 is representative only, and may, of course, be fabricated in a plurality of ways by those skilled in the art.

The operation of the Measured Deviation Register may be understood by considering a typical shift register. The lowermost shift register handles the least significant binary digit and will serve as an example. It comprises a plurality of magnetic cores 3–06, 3–10, through 3–11, constructed of a material having a substantially rectangular hysteresis loop characteristic. Upon energization of set lead 3–07, the first core 3–06 selectively assumes one of two magnetic states in accordance with the value of the first binary digit of the deviation data. Application of a shifting pulse from the shift pulse generator 3MDSD over lead 3–08 at a subsequent time is effective to transfer the magnetic state of each core to its successor in the register. Thus, the first shift pulse would transfer the state of core 3–06 to core 3–10. Successive applications of shift pulses on lead 3–08, which is common to the entire Measured Deviation Register, causes the simultaneous shifting of states from preceding to successive magnetic cores in each shift register from the first to the last core. In the shift register being considered, the last core is denoted 3–11. The number of cores in the shift registers is determined by the distance between the input measuring gage 3–04 or 3–05 and the bite of the mill and also, by the time interval between the application of shift pulses from generator 3MDSD. The distance of the gages from the mill bite is determined by structural limitations and the intervals between shift pulses is determined by the resolution required in the system.

Specific circuitry for loading the entry gage deviation information into the first magnetic core of each shift register; in other words, the generation of representative binary signals on the output of analog-to-digital converter 3–03 has not been illustrated. This circuitry comprises gating elements operative in response to the rolling direction of the mill to apply the deviation data from either the left or right gage 3–04 or 3–05 respectively. The specific circuitry included in the analog-to-digital converter 3–03 is dependent upon the nature of the output available from gages 3–04 and 3–05 and it is well within the skill of those in the art to construct such circuitry. The sequential stepping of the information stored in the Measured Deviation Register and its ultimate use for comparison with the required entry gage deviation $\Delta H_{ir}$ will be understood fully when discussed hereinafter in conjunction with the calculating operations.

*Calculation of required entry gage deviation*

During each of the above operations, the start-up address shift register in FIG. 6 continues to step under the influence of the triggering pulses developed by the start-up pulse generators 4SUP1 and 4SUP2. When the last stage 6SA5 assumes its one condition, the final gates are prepared for application of the dynamic input information from the gages 3–04 or 3–05 and from the tachometers 11PGTL and 11PGTR. Upon being switched to the one condition, shift register stage 6SA5 develops a negative voltage transition upon lead 6–03 and a positive voltage transition upon lead 6–04.

The negative signal on lead 6–03 is applied to set the normal cycle flip-flop 9NC in FIG. 9 to a one condition as an indication that a normal cycle is to proceed. In response to being set, normal cycle flip-flop 9NC develops a zero signal on lead 9–08 which is applied to enable an inverting AND gate 10–06 and thereby gate counting pulses to the Deviation Interval Counter, and which is also applied to an inverting AND gate 10–07 to provide an enabling signal which subsequently controls the resetting and gating of error storage information into the Binary Comparator from the Deviation Calculation Counter.

The positive voltage transition appearing on lead 6–04, is applied to an inverting AND gate 12–16 in the upper left quadrant of FIG. 12 as an enabling signal to initiate the normal cycle calculating operation. The other input to inverting AND gate 12–16 is supplied by on trigger 9ONT and comprises a positive impulse applied over leads 9–09 and 11–20 during the start conditions. In response to this full complement of inputs, inverting AND gate 12–16 develops a one output on lead 12–17 which is applied to set normal-cycle-gating flip-flop 12NCG to a one state. When in a one state, flip-flop 12NCG provides a zero enabling signal to inverting AND gate 12–01, the function of which is to gate through the calculating count-down pulse from the entry tachometer.

The start-up shift register in FIG. 6 has now completed its full cycle of operation and the system contains all information required to commence calculation. Furthermore, all gates are enabled for the transmission of the dynamic input information into the system for its operation. It now remains to consider the functioning of the system during the application of dynamic information concerning the characteristics of the material being operated upon.

It will be recalled that the calculation of the required entry gage $\Delta H_{ir}$ is made by pulsing down the desired exit gage number $H_o$ stored in the Sample Time Counter with a plurality of pulses from the entry gage tachometer having a repetition rate commensurate with the input velocity $v_i$. During the interval while the Sample Time Counter is being pulsed down, the number in the Deviation Calculation Counter which represents the expected entry gage $H_1$ is pulsed down by a plurality of pulses from the exit tachometer which has a repetition rate commensurate with the exit velocity $v_o$. When the sample time interval, i.e., the interval between initial pulsing and the registration of a zero in the Sample Time Counter, has elapsed, the pulse input to the Deviation Calculation Counter is inhibited. The number remaining in the Deviation Calculation Counter at this time is then transferred into the Calculated Deviation Storage, from which it is applied to the Binary Comparator. The Binary Comparator has as its second input the actual entry gage deviation $\Delta H_1$ and consequently will provide an output which is commensurate with the difference between the two input values.

Consider first the application of the input velocity signal $v_i$ to pulse down the desired exit gate in the Sample Time Counter in order to develop the sample time interval.

In forward operation, the lefthand tachometer 11PGTL provides the entry velocity $v_i$. It is the output from this tachometer which must be gated as a countdown pulse to the Sample Time Counter. This is implemented by the gates located in FIGS. 11 and 12.

Tachometer 11PGTL, in conjunction with pulse multiplier 11ML, produces positive pulses at a repetition rate commensurate with the velocity $v_i$ and applies them to inverting AND gates 11–04 and 11–08. Multipliers 11ML and 11MR operate to increase the accuracy of the tachometers. They may take the form, for example, shown in the co-pending application of R. C. Clark, Serial No. 158,725, filed December 12, 1961, and assigned to the General Electric Company. These inverting AND gates have an additional input from the forward-reverse trigger 11FRT over leads 11–19 and 11–18 respectively. In accordance with the convention hereinbefore adopted, when the mill is operating in a forward direction, lead 11–19 exhibits a zero condition and when the mill is operating in a reverse direction, lead 11–18 exhibits a zero condition. Thus, inverting AND gate 11–04 is the only one having a full complement of inputs in response to pulses from multiplier 11ML and this AND gate, therefore, produces a signal at its output which is applied as one of two inputs to inverting OR gate 11–06. The other of said inputs being a part of a mirror circuitry for application of the output from multiplier 11MR associated with the righthand tachometer 11PGTR and being operative when the mill is in reverse direction.

In response to the one condition at its input, gate 11–06 produces an output which is applied to one of the inputs of inverting AND gate 11–10. This latter inverting AND gate has a second input from lead 9–09 which exhibits a zero state in response to the setting of the entire system by operation of the start switch in FIG. 9. Thus, when the system is operating, inverting AND gate 11–10 produces an output which is applied through inverting OR gate 11–12 and appears as a zero signal on lead 11–01. In FIG. 12 it will be seen that lead 11–01 provides one of the inputs for inverting AND gate 12–01.

The function of inverting AND gate 12–01 is to direct the calculating countdown pulse representative of the entry velocity $v_i$ to the Sample Time Counter. Four inputs are presented to this gate. They include the one previously mentioned; an enabling signal from the normal-cycle-gating flip-flop 12NCG hereinbefore discussed; a zero condition on lead 12–12 which is associated with zerosensing-amplifier 8ZSA in FIG. 8 and indicates that the Sample Time Counter is not in a zero state; and a signal from the inverse output of start-calculation gate 12SCG.

Start gate 12SCG is set to a one state when calculation is to commence. The condition establishing this is the presence of a signal on lead 11–01 while normal-calculation-gate 12NCG is in a one state. This condition is imposed by the insertion of inverting AND gate 12–15 having inputs from the inverse output of normal-cycle-gate 12NCG and lead 12–01.

When all inputs to inverting AND gate 12–01 are satisfied, the signals on its output lead are applied via inverting OR gate 12–03, lead 12–08, inverting AND gate 10–06, and lead 10–01, to the Deviation Interval Counter in FIG. 4; and via lead 12–09 to the Sample Time Counter in FIGS. 7 and 8. Leads 12–08 and 12–09 deliver a plurality of positive going pulses occurring at a rate that is commensurate with the input velocity $v_i$.

The Sample Time Counter appearing in FIGS. 7 and 8 is responsive to the input pulses on lead 12–09 to count down until a zero condition is exhibited by all of the stages. At that time, lead 7–20 is conditioned to exhibit a zero state. Inverting amplifier 8ZSA transmits and inverts this state via lead 8–01 to the input of inverting AND gate 12–01 inhibiting any further passage of pulses therethrough from the tachometer and, thus, cuts off the application of further counting pulses. During the sample time interval, however, pulses were applied vial lead 12–08 and gate 10–01 in FIG. 10 to the input of the Deviation Interval Counter and it commenced counting in an upward direction.

The Deviation Interval Counter is a simple binary counter arranged to count up in response to each input pulse on lead 10–01. The number of stages included in the Deviation Interval Counter is determined by the velocity of the material through the mill and by the resolution required of the measuring system. The function of the interval counter is to produce a discrete signal at a time equal the time required to transport a particular length of material.

With the Deviation Interval Counter illustrated, two particular permutations of states are used to generate shifting pulses for application to the Measured Deviation Register. It should, of course, be understood that it is within the skill of those in the art to utilize the counter to obtain any desired duration between pulses extracted therefrom. In the illustrated case, inverting AND gate 4–21 is connected to provide an output signal when counter stages 4–14 and 4–20 are in a one condition, and inverting AND gate 4–22 is connected to provide an output signal when stages 4–16 through 4–19 are all in a one condition. Operation of inverting AND gate 4–21 triggers deviation interval pulser 4DIP through inverting OR gate 4–05 and inverting AND gate 4–07, whenever there is no reset signal on conductor 4–08. Similarly, the output from inverting AND gate 4–22 drives the multivibrator 4DIP through an inverting OR gate 4–06 and inverting AND gate 4–07.

As in the case of the start-up procedure, multivibrator 4DIP produces a 70 microsecond pulse at its inverse output which is inverted by logic amplifier 4–09 and applied to the Deviation Interval Counter as a reset pulse. In addition, a negative impulse is generated in the upper output terminal of multivibrator 4DIP which is applied over lead 4–01 to initiate shifting of the magnetic core shift registers in the Measured Deviation Register. Lead 4–01 is connected to the upper input terminal of the measured-deviation-shift pulse generator 3MDSP in FIG. 3. In response to conditioning of lead 4–01, multivibrator 3MDSP generates a 100 microsecond negative pulse at its upper output terminal which is applied to shift pulse generator 3MDSD. The output of shift pulse generator 3MDSD supplies a shifting signal to each magnetic core in the Deviation Register and is effective in well-known fashion to transfer the states of preceding cores to their successors in their shift register chain. In addition to driving the shift pulse generator 3MDSD, the measured-deviation-shift pulse generator MDSP provides a positive output on lead 3–12 to an input of inverting AND gate 3–13.

It will be recalled that the second input of inverting AND gate 3–13 is supplied by the reset core interrogation pulser 3RCIP which develops a zero pulse in response to each digit presented by the analog-to-digital converter 3–03. Thus, in the event a shift pulse is applied to the Register simultaneous with the storage of new information in the first cores, the reset-core-pulser 3RCP receives an input pulse from inverting AND gate 3–13 and delivers an energizing output through amplifier 3–14 to a reset core relay 3RCR. In response to this energizing signal, reset core relay 3RCR is energized and delivers a negative potential to each of the first cores in the Measured Deviation Register, resetting them to a zero state preparatory to receiving the next digit representative of the measured input deviation. This avoids ambiguity due to simultaneous setting and shifting.

In recapitulation, it will be seen that as the Deviation Interval Counter counts up in response to the output pulses of tachometer 11PGTL, shift pulses are applied to the Measured Deviation Register causing the actual measured deviation to be transferred from core to core in synchonism with the actual flow of material. When the material is at the bite of the mill, the last magnetic core of the shift register, for example, 3–11, transfers its state to a buffer storage flip-flop, for example, 3–14. Each of the buffer storage flip-flops are connected to assume a state representative of a binary digit in the input deviation of the material within proximity of the bite of the mill. A plurality of leads 3–01, 3–02 through 3–09, each connected to the "1" output of the buffer flip-flops, interconnect these "1" outputs to the A inputs of the binary comparator units in FIG. 14. Thus, the actual deviation of the input gage is presented at the Binary Comparator in FIG. 14 for comparison.

While the Sample Time Counter is being counted down, the Deviation Calculation Counter in FIG. 13 is simultaneously being counted down by the pulses from tachometer 11PGTR which have a repetition rate dictated by the output velocity $v_o$ of the material. The application of these pulses to the Deviation Calculation Counter is performed through a plurality of gates similar to those already considered in conjunction with the application of pulses from the left tachometer 11PGTL. Because of the similarity, it will be merely necessary to indicate, in sequence, the elements encountered by the pulse train from tachometer 11PGTR. These elements include multiplier 11MR, inverting AND gate 11–07, inverting OR gate 11–09, inverting AND gate 11–14, inverting OR gate 11–15, lead 11–03, inverting AND gate 12–05, inverter 12–07, and lead 12–11. The countdown of the Deviation Calculation Counter may only take place while the Sample Time Counter contains a registered number. This is insured by the connection of the zero sensing amplifier 8ZSA to one of the inputs of inverting AND gate 12–05.

The Deviation Calculation Counter in FIG. 13 is a straight binary countdown counter having the "0" outputs of preceding stages connected to the pulse inputs of succeeding stages. The number of stages employed is dictated by the magnitude of the binary number to be registered and counted therein.

When the Sample Time Counter has registered zero, all further counting pulses from the righthand tachometer 11PGTR are inhibited at AND gate 12–05 from further action upon the Deviation Calculation Counter and the number stored therein, as previously discussed, represents the required input deviation $\Delta H_{ir}$. It now remains only to apply this required deviation to the Binary Comparator for comparison with the actual deviation and consequent generation of an error signal.

The required transfer of the remaining information from the Deviation Calculation Counter through the Calculated Deviation Storage units to the Binary Comparator takes place under the control of the reset-error-storage-pulser and gate-error-storage-pulser 10RESP and 10GESP respectively. When the Sample Time Counter has been counted down to zero, the zero sensing amplifier 8ZSA generates a one signal on leads 8–01 and 12–12 which is applied through inverter 10–08 to enable inverting AND gate 10–07. Inverting AND gate 10–07 has two other inputs: the first, via lead 9–08 from the complementary output of normal cycle flip-flop 9NC; and the second, from the trigger output of trigger 9T3 in the test circuit of FIG. 9. During a normal cycle, lead 9–03 is conditioned to a zero and the trigger output of trigger 9T3 is zero. Consequently, an output signal from inverting AND gate 10–07 is applied to trigger both the reset-error-storage-pulser 10RESP and the gate-error-storage-pulser 10GESP. The reset-error-storage-pulser generates a 13 microsecond negative signal which is applied as a reset pulse via inverting OR gate 10–09, amplifier 10–10, and lead 10–04 to the buffer storage flip-flops 13CD1 through 13CD9. This reset pulse sets each of the error storage flip-flops to zero. Subsequently, the gate-error-storage-pulser 10GESP produces a 25 microsecond negative pulse which is applied via amplifier 10–11 and lead 10–05 to enable gates 13–11 through 13–19 for transfer of the number registered in the Deviation Calculation Counter to the storage flip-flops. This transfer occurs approximately 25 microseconds after the Sample Time Counter is counted down to zero.

The "0" outputs from each of the flip-flop stages in the calculated deviation storage units are connected to the B inputs of the full adders 14–01 through 14–09 of the Binary Comparator. The full adder units have been described hereinbefore and consequently, it will be clear that the result of the simultaneous application of numbers representing the actual input deviation $\Delta H_i$ to the A inputs and of numbers representing the binary-ones-complement of the required input deviation $\Delta H_{ir}$ to the B inputs will result in a binary notation on the output leads 14–11 through 14–19 which equals the difference between $\Delta H_i$ and $\Delta_{Hir}$.

The Binary Comparator circuitry is composed of the full adders 14–01 through 14–09 in conjunction with a plurality of inverting AND gates, for example, 14–21 and 14–22, which are associated with each full adder element. These inverting AND gates supply an OR gate, for example, 14–23, which provides an output on one of the output leads, for example, 14–11, in accordance with the actual comparison. In addition to the inverting AND gates and OR gates, discrete output signals are derived from the final full adder element 14–09 which indicate whether or not the comparison has resulted in a positive or negative figure. These outputs are extracted from the carry and inverse-carry outputs of full adder 14–09 and are processed by inverting logic amplifiers 14–24 and 14–25 respectively before application via leads 14–26 and 14–27 to a digital-to-analog converter 14–28.

The function of the digital-to-analog converter 14–28 is merely to develop an analog signal that is commensurate with the number registered in digital form on the output leads 14–11 through 14–19. It being recognized that this number is proportional to the error by which the actual input deviation exceeds, or is less than, the required input deviation. The screw control mechanism 14–29 of the mill has been shown diagrammatically by a box. It will be understood that any control mechanism may be substituted therefor which will yield variations of mill positioning in accordance with the signal from the Binary Comparator. The binary comparator circuit itself has been fully illustrated and described in the co-pending patent application of K. R. Thompson, Serial No. 159,264, filed December 14, 1961.

*Test circuitry*

When the automatic gage control is not being used by an operator, testing may be accomplished by utilization of five test triggers, 9T1 through 9T5, located in FIG. 9. These triggers and their associated circuitry act to inhibit and advance the calculation process at intervals determined by manipulation of the push-buttons, 9PB1 through 9PB4. In response to such push-button manipulation, the leads 9–10, 9–11, 9–12, and 9–13 are selectively energized to gate signals from the pulse generator 11TACP to the various counting circuits. In these instances, the pulses from the pulse generator 11TACP are used to simulate the tachometer outputs available under normal operation.

The illustrated circuit schematic and its description present an illustrative embodiment of a system which uses the deviation from expected entry gage in order to develop control signals to insure a desired output gage.

While the above described circuit constitutes a particular embodiment of the invention it will, of course, be understood that it is not wished to be limited thereto since modifications can be made both in the circuit arrangement and in the instrumentalities employed and it is contemplated in the appended claims to cover any such modifications as fall within the true spirit and scope of the invention.

What is claimed as new and desired to be secured by Letters Patent of the United States is:

1. In a system for reducing the thickness of strip material to a desired gage, a pair of opposing work surfaces having an adjustable separation, means for transporting said material between said opposing work surfaces, means for registering a predetermined gage and said desired gage, measuring means located before said work surfaces and settable for measuring the deviation of the thickness of said material from said predetermined gage, velocity measuring means for measuring the velocity at which said material enters between said work surfaces, velocity measuring means for measuring the velocity at which said material exits from between said work surfaces, calculating means operative in response to said predetermined gage, the entry and exit velocities, and said desired gage to produce a control indication discretely representative of the required deviation in thickness of said material to yield said desired gage, and comparison means for comparing said control indication with the measured deviation to develop a control signal for setting the separation of said work surfaces to yield said desired gage.

2. The system defined in claim 1 wherein said calculating means comprises, a first counting means registering a number representative of said desired gage, a second counting means registering a number representative of said predetermined gage, and means for counting down said counting means at rates proportional to said entry and exit velocities respectively until said first counting means registers zero at which time said second counting means registers the required deviation in thickness of said material to yield said desired gage.

3. In a system for reducing the thickness of strip material from a gage of a substantially predetermined original value $H_i$ to a desired gage $H_o$, a pair of opposing work surfaces having an adjustable separation, means for transporting said material between said opposing work surfaces, means for discretely registering conditions representing said original value $H_i$ and said desired value $H_o$, means for sensing the entry and exit velocities at which said material enters into and exits from said work surfaces, calculating means operative in response to the registered conditions representing $H_o$ and $H_i$ and to said entry and exit velocities to produce a first indication discretely representative of the required deviation of the material thickness from $H_i$ to yield $H_o$, means for sensing the actual deviation from $H_i$ of the original material thickness and operative to produce a second indication discretely representative thereof, comparison means for comparing said first and second indications and yielding a signal commensurate with the difference therebetween, and control means responsive to the signals from said comparison means to selectively adjust the separation between said work surfaces.

4. A system as defined in claim 3 in combination with, means for registering said predetermined value and said desired gage in decimal form, a source of pulses, a binary-coded-decimal countdown counter connected to said registering means to selectively register the numbers stored therein in binary-coded-decimal form in response to control signals, a binary counter, and means for simultaneously applying said pulses to said binary-coded-decimal countdown counter and said binary counter until said binary-coded-decimal countdown counter registers zero and thereafter inhibiting further pulses.

5. In a system for reducing the thickness of strip material from a gage of a substantially predetermined value to a desired gage, a pair of opposing work surfaces having an adjustable separation therebetween, means for transporting said material between said opposing work surfaces, first countdown means registering a number representative of said predetermined value, second countdown means registering a number representative of said desired gage, first pulse generating means for generating a plurality of pulses at a repetition rate commensurate with the velocity of the material entering between said work surfaces, second pulse generating means for generating a plurality of pulses at a repetition rate commensurate with the velocity of the material exiting from between said work surfaces, means for simultaneously applying the pulses from said first and second pulse generating means to said second and first countdown means respectively, means operative when said second countdown means registers zero for terminating the application of said pulses, measuring means for measuring the original deviation of thickness of said material from said predetermined value, and means operative in response to the number remaining in said first countdown means and the output of said measuring means to develop a control signal for adjusting the separation of said work surfaces to yield said desired gage.

6. In a system for reducing the thickness of strip material from a gage of a substantially predetermined value to a desired gage, a controllable mill having adjustable separation between the rollers, means for transporting said material through said mill, an entry gage for measuring the deviation in thickness of said material from said predetermined value before entry to the mill, registering means for storing numbers representative of said predetermined value and said desired gage, a binary-coded-decimal countdown counter, means for transferring the number representative of said predetermined value into said binary-coded-decimal countdown counter, a pulse generator producing pulses at a fixed repetition rate, a binary countup counter, means for simultaneously applying the pulses from said pulse generator to said binary-coded-decimal countdown counter and said binary countup counter until said binary-coded-decimal counter registers zero, a binary countdown counter, means for transferring the number registered in said binary countup counter to said binary countdown counter, means for transferring the number representative of the desired gage from said register to said binary-coded-decimal countdown counter, means for generating pulse trains having repetition rates commensurate with the entry and exit velocity of said material to and from said mill respectively, means for applying said pulse trains as counting pulses to said binary-coded-decimal countdown counter and said binary countdown counter respectively until said binary-coded-decimal counter registers zero, means for comparing the number remaining in said binary countdown counter with the actual deviation measured by said entry gage and producing a signal discretely representative of the difference therebetween, and control means operative in response to said signal for adjusting the separation of said mill to yield the desired output gage.

7. In a system for reducing strip material from a gage of a substantially predetermined value to a desired gage, means for passing said material through a controllable mill, first pulse generating means responsive to the material velocity entering said mill to generate pulses at a repetition rate commensurate with said velocity, second pulse generating means responsive to the material velocity leaving said mill to generate pulses at a repetition rate commensurate with said velocity, means controlled by the original thickness of said material to yield a numerical indication of the deviation of said original thickness from said predetermined value, a first descending counter registering a number representative of said desired gage, a second descending counter registering a number representative of said predetermined value, means for simultaneously applying the outputs of said first and second pulse generating means to said first and second descending counter respectively to decrease the numbers registered therein, sensing means operative in response to said first descending counter registering zero to terminate further counting in either counter, means operative upon termination of counting to compare the number remaining in said second descending counter with said numerical indication of the deviation of said original thickness and produce a numerical indication discretely representing the difference therebetween, and control means operative in response to the latter numerical indication to adjust said mill to provide said desired gage.

8. A system as defined in claim 7 in combination with, means for manually registering said predetermined value and said desired gage in decimal form, means for translating said predetermined value into binary-coded-decimal form and registering it in said first descending counter, a binary-coded ascending counter, a source of pulses, means for simultaneously applying said pulses to said first descending counter and said binary-coded ascending counter until said first counter registers zero, and means operative after said first descending counter registers zero to translate said desired gage into binary-coded-decimal form and register it in said first descending counter and to register the number in said binary-coded ascending counter in said second descending counter.

9. In a system for reducing strip material from a gage of a substantial predetermined value to a desired gage, means for passing said material through an adjustable mill, means for registering said predetermined value and said desired gage, velocity measuring means located before and after said mill to measure the entry and exit velocity of said material, calculating means operative in response to said predetermined value, said entry and exit velocities, and said desired gage to produce a control indication representative of the required deviation in thickness of said material to yield said desired gage, measuring means located before said mill for measuring the deviation of the thickness of said material from said predetermined value and producing a discrete indication thereof, means for storing said discrete indication until the measured increment of material is substantially at the bite of said mill, and comparison means responsive to said discrete indication after storage and to said control indication to develop control signals for selectively adjusting said mill.

References Cited by the Examiner
UNITED STATES PATENTS

| | | | |
|---|---|---|---|
| Re. 25,075 | 10/61 | Hessenberg | 80—32.1 |
| 3,015,974 | 1/62 | Orbom et al. | 80—56.1 |
| 3,054,311 | 9/62 | Murtland | 80—56.1 |

WILLIAM J. STEPHENSON, *Primary Examiner.*
LEON PEAR, *Examiner.*